(12) United States Patent
Harel et al.

(10) Patent No.: US 11,154,053 B2
(45) Date of Patent: Oct. 26, 2021

(54) COMPOSITIONS FOR CONTROLLING PHYTOPLANKTON CONTAMINATION

(71) Applicant: BLUEGREEN WATER TECHNOLOGIES LTD., Tel Aviv (IL)

(72) Inventors: Moshe Harel, Mevo Betar (IL); Oleg Yu. Berezin, Maale Adumim (IL)

(73) Assignee: Bluegreen Water Technologies Ltd., Tel Aviv (IL)

( * ) Notice: Subject to any disclaimer, the term of this patent is extended or adjusted under 35 U.S.C. 154(b) by 0 days.

(21) Appl. No.: 15/930,141

(22) Filed: May 12, 2020

(65) Prior Publication Data

US 2020/0267970 A1  Aug. 27, 2020

Related U.S. Application Data

(63) Continuation of application No. PCT/IL2020/050115, filed on Jan. 30, 2020.

(30) Foreign Application Priority Data

Feb. 5, 2019 (IL) .......................................... 264657

(51) Int. Cl.
*A01N 25/12* (2006.01)
*A01N 59/20* (2006.01)
(Continued)

(52) U.S. Cl.
CPC ............. *A01N 25/12* (2013.01); *A01N 59/00* (2013.01); *A01N 59/06* (2013.01); *A01N 59/12* (2013.01); *A01N 59/20* (2013.01)

(58) Field of Classification Search
None
See application file for complete search history.

(56) References Cited

U.S. PATENT DOCUMENTS 4,293,426 A * 10/1981 Gago .................... C01B 15/043
210/759
5,698,210 A * 12/1997 Levy ...................... A01N 25/10
424/405
(Continued)

FOREIGN PATENT DOCUMENTS

AU     2016370997    6/2018
CN     102308852     1/2012
(Continued)

OTHER PUBLICATIONS

Berman-Frank et al (2004) The Demise of the Marine *cyanobacterium* ssp., via an autocatalized cell death pathway, Limnol. Oceanogr 49(4): 997-1005.
(Continued)

*Primary Examiner* — Isis A Ghali
(74) *Attorney, Agent, or Firm* — Wenderoth, Lind & Ponack, L.L.P.

(57) ABSTRACT

A composition for mitigating, inhibiting, ameliorating and/or eliminating phytoplankton growth in a waterbody, the composition comprising an active ingredient at concentration of 80.0-99.5% (w/w) of the composition and a coating material at concentration of 0.5-20% (w/w) of the composition; wherein the critical surface tension of the composition is between 15-60 dyn/cm and wherein the relative density of the composition, prior to being submerged in water, is above 1 g/cm$^3$.

11 Claims, 16 Drawing Sheets
(6 of 16 Drawing Sheet(s) Filed in Color)

(51) Int. Cl.
*A01N 59/00* (2006.01)
*A01N 59/06* (2006.01)
*A01N 59/12* (2006.01)

(56) References Cited

U.S. PATENT DOCUMENTS

| | | | |
|---|---|---|---|
| 2004/0185079 | A1 | 9/2004 | Zomer |
| 2009/0069181 | A1* | 3/2009 | Boulos .................... C02F 1/722 504/151 |
| 2013/0130910 | A1 | 5/2013 | Hori et al. |

FOREIGN PATENT DOCUMENTS

| | | |
|---|---|---|
| CN | 102351254 | 2/2012 |
| JP | 6629670 | 1/2020 |
| KR | 10-1752198 | 5/2016 |
| PL | 414 134 | 3/2017 |
| WO | 2015001563 | 8/2015 |

OTHER PUBLICATIONS

Spungin et al (2018) Programmed cell death in diazotrophs and the fate of organic matter in the western tropical South Pacific Ocean during the OUTPACE cruise, Biogeosciences 15: 3893-3908.

Tsiarta et al (2017) Mode of action of hydrogen peroxide, peroxymonosulfate and persulfate on Microcystis aeruginosa strain PCC 7806, 15th International Conference on Environmental Science and Technology.

Lurling et al (2015) Evaluation of several end-of-pipe measures proposed to control cyanobacteria, Aquat Ecol 1-21.

Yang et al (2017) The algicidal mechanisms of prodigiosin from *Hahella* sp. KA22 against Microcystis aeruginosa, Scientific Reports, doi: 10.1038/s41598-017-08132-5.

Ding et al (2012) Hydrogen peroxide induces apoptotic-like cell death in Microcystis aeruginosa (chroococcales, Cyanobacteria) in a dose-dependent manner, Phycologia, vol. 51(5): 567-575.

Daniel et al (2019) The response of Microcystis aeruginosa strain MGK to a single or two consecutive H2O2 applications, Environmental Biology Reports, doi: 10.1111/1758-2229.12789.

Peng Gu et al (2019) Effects of different metal ions (Ca, Cu, Pb, Cd) on formation of cyanobacterial blooms, Ecotoxicology and Environmental Safety, https://doi.org/10.1016/j.econoenv.2019.109976.

Lin et al (2018) The ecological risks of hydrogen peroxide as a cyanocide: its effect on the community structure of bacterioplankton, Journal of Oceonology and Limnology, vol. 36, No. 6: 2231-2242.

Matthijs et al (2012) Selective Suppression of harmful cyanobacteria in an entire lake with hydrogen peroxide, Water Research 46: 1460-1472.

Murik et al (2014) Dehydroascorbate: a possible surveillance molecule of oxidative stress and programmed cell death in the green alga *Chlamydomonas reinhardtii*, New Phytologist, 802: 471-484.

Ning et al (2002) Salt stress induces programmed cell death in prokaryotic organism Anabaena, Journal of Applied Microbiology, 93: 15-28.

Tichy et al (1999) In Vivo Role of Catalase-Peroxidase in *Synechocystis* sp. Strain PCC 6803, Journal of Bacteriology, March, pp. 1875-1882.

Weenick et al (2015) Combatting cyanobacteria with hydrogen peroxide: a laboratory study on the consequences for phytoplankton community and diversity, Frontiers in Microbiology, vol. 6, Article 714.

Hu et al (2019) Programmed Cell Death-Like and Accompanying Release of Microcystin in Freshwater Bloom-Forming Cyanobacterium Mycrocystis: From Identification to Ecological Relevance, Toxins 2019, 11, 706 doi:10.3390/toxins11120706.

WHO (2004) Copper in Drinking-Water, Background Document for development of WHO Guidelines for Drinking-Water Quality, www.who.int/water_sanitation_health/dwq/chemicals/copper.pdf.

Sakai (2013) Occurrence and Distribution of Microcystins in Lake Taihu, China, Scientific World Journal, doi:10.1155/2013/8389176.

Joo et al (2020) Growth Inhibition of Microcystis aeruginosa Using TiO2-Embedded Expanded Polystyrene Balls, J Nanosci. Nanotechnol, vol. 20, No. 9: 5775-5779.

Extended European Search Report dated Aug. 4, 2021 in European Application No. 20751954.7.

* cited by examiner

FIG. 5A
FIG. 5B
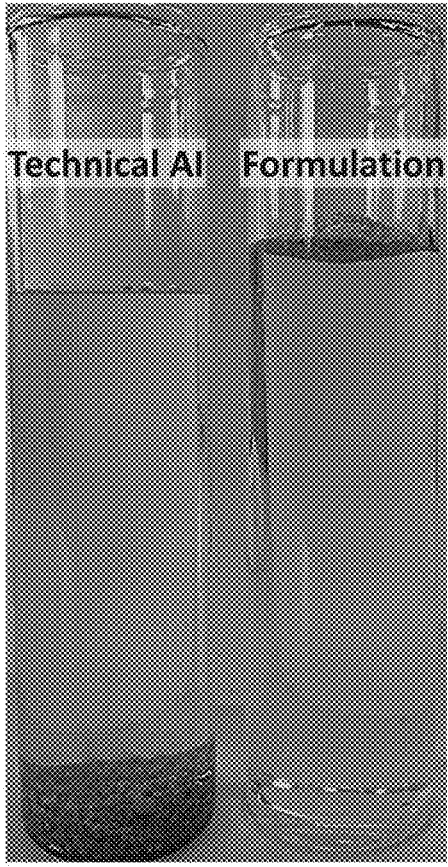
FIG. 6
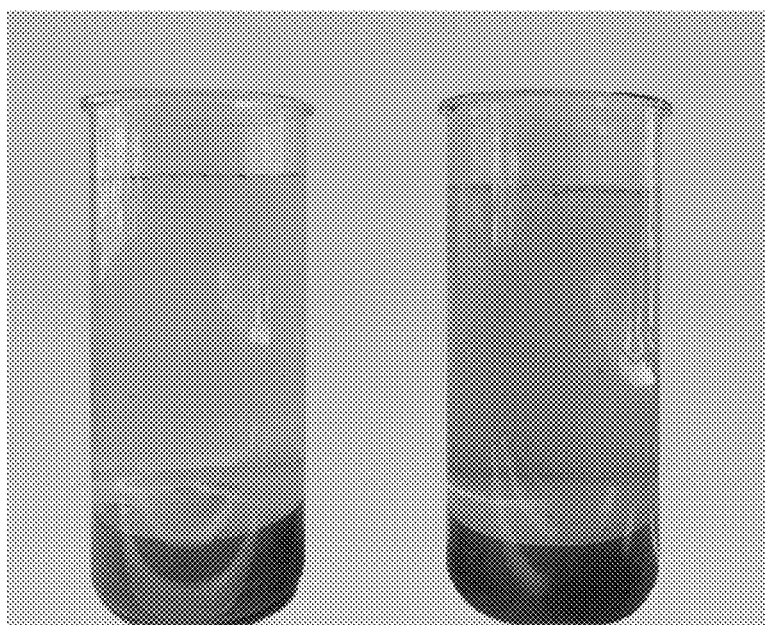

FIG. 7
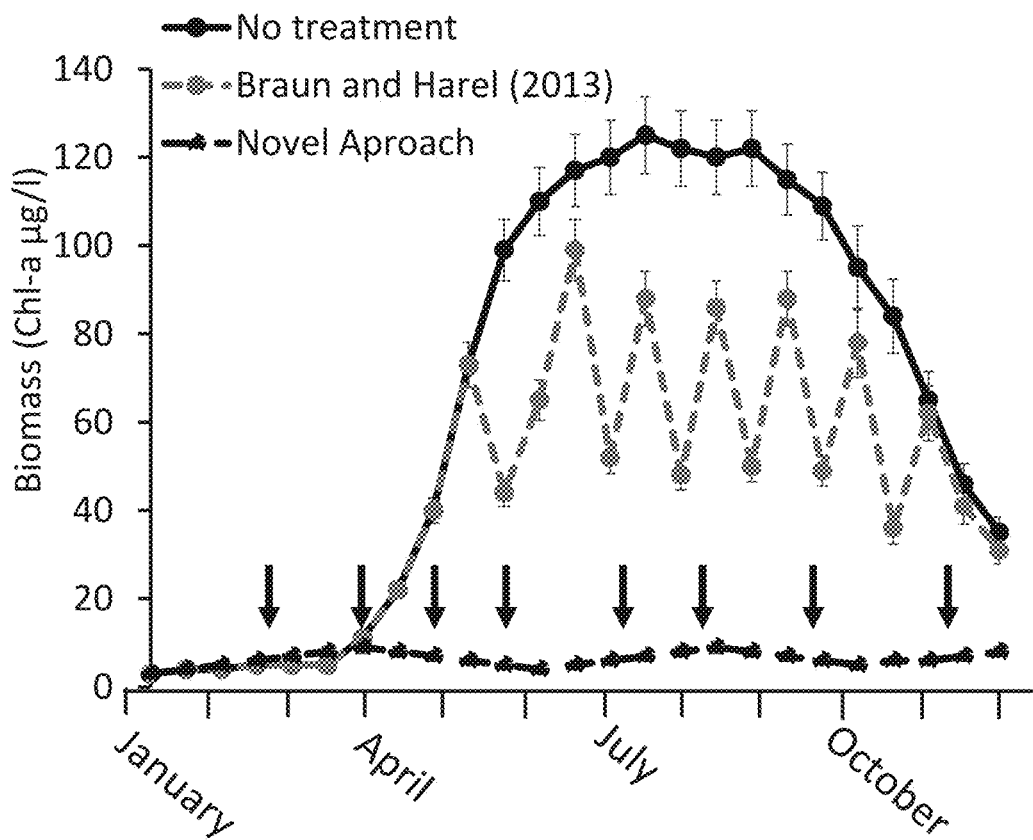
FIG. 8A            FIG. 8B

Cyanobacterial sp. Anabaena sp.

Planktothrix sp.

Spirulina sp. Diatom sp.

Chlamydomonas sp.

COMPOSITIONS FOR CONTROLLING PHYTOPLANKTON CONTAMINATION

RELATED APPLICATIONS

This application is a continuation of International Patent Application No. PCT/IL2020/050115, filed Jan. 30, 2020, which claims priority to Israeli Application No. 264657, filed Feb. 5, 2019, the entire disclosures of which are hereby incorporated herein by reference.

FIELD OF DISCLOSURE

The present invention discloses compositions for cost-effective mitigation of aquatic phytoplankton blooms.

BACKGROUND OF THE INVENTION

Under favorable conditions, yet not fully defined, the growth rate of a dominant phytoplankton specie increases, leading to a large rise in its biomass, a process often term "bloom". Intensification of toxic phytoplankton blooms, that may cover large areas, is a matter of growing concern to the public, water authorities and environmental scientists worldwide. Formation of various toxins by these organisms constitutes a serious threat to the water quality in lakes and reservoirs and their use for drinking water, recreational activities and irrigation. Clearly, the approaches currently used to limit toxic blooms, such as management of the drainage basin (to reduce nutrient inputs), are expensive and unsuccessful.

Approximately 300 phytoplankton species—cyanobacteria (often called blue-green algae) such as *Microcystis* sp. and microalgae are known to form massive blooms, many of them producing an array of toxic chemicals. Due to massive $O_2$ consumption in respiration, the blooms may cause depletion of $O_2$ and massive death of fish and fauna, and clogging of the water pumps and filters. The annual global losses associated with these blooms is estimated at many billions of USD (US EPA, Compilation of cost data associated with the impacts and control of nutrient pollution, 2015).

Cyanobacteria are photosynthetic (gram-negative) bacteria. Many cyanobacterial species produce and thereafter release toxins (a.k.a. "cyanotoxins") into the water either towards the end of the bloom or under physical duress (e.g., during filtration or pumping) (Huisman, et al., Nature Rev Microbiol 16: 471-483, 2018). Studies showed that cyanotoxins cause death and various illnesses in humans and animals who drink, swim or even consume food that was exposed to infested water. The cyanotoxins are not sensitive to boiling, and can only be treated to allow for drinking with heavy chlorination. The WHO recommends prohibiting consumption of, or recreation in, water where toxic cyanobacterial biomass exceeds 10 µg/l chlorophyll-a (WHO, Guidelines for Drinking-Water Quality, Addendum to Volume 2, Health Criteria and Other Supporting Information, 1998) and may reach levels as high as 1100 µg/l chlorophyll-a (Bertone et al. Environ Microbiol 9: 1415-1422, 2018; Otten et al. Environmental Science and Technology 46: 3480-3488, 2012; Huisman (ibid.)). Further, cyanobacterial blooms excrete massive amounts of polysaccharides into the water, turning it viscous. This phenomenon is sometimes also related to "swimmers' itch"—due to the itch caused when coming in contact with contaminated water. It further creates operational problems for water utility companies that face regularly clogged pipes as well as for farmers preventing them from using drip-irrigation systems.

Microalgae are a diverse group of eukaryotic photosynthetic microorganisms that includes several groups including green-algae, red algae, brown algae, diatoms and dinoflagellates. They are responsible for clogged pipes in reservoirs used for irrigation or sewage ponds. Some algal species (e.g., *Prymnesium* sp., *Karenia* sp., *Alexandrium* sp. and others) are toxic as well and are responsible for mass fish-mortality in aquaculture and marine environments. Illnesses and even deaths are occasionally reported among people and animals that consumed toxic water or seafood contaminated with algal toxins.

Most phytoplankton blooms are treated worldwide with copper salts such as copper sulfate pentahydrate ($CuSO4.5H2O$, CAS NO. 7758-99-8, "copper"), a relatively safe and effective algaecide that causes algal lysis. However, in water with high organic load, mineral content or pH levels above pH 7.0, its efficacy is reduced dramatically.

Other, less-frequently used algaecides are based on hydrogen peroxide ($H_2O_2$) either via direct application or its release from various compounds such as percarbonates. Cyanobacteria are far more sensitive to $H_2O_2$ than most microalgae (Drabkova et al. Environ Sci Technol 41: 309-314, 2007). Thus, $H_2O_2$ treatments damage toxic cyanobacteria while far less affecting other algae.

As fish and some other water living organisms are sensitive to $H_2O_2$, it is required by the US EPA to avoid a full-lake application over the course of one day to allow those organisms to flee to untreated areas.

The mode of action of $H_2O_2$ involves the triggering of oxidative stress. Thereby it may prompt an autocatalytic cell-death cascade (Berman-Frank et al., Environ Microbiol 9: 1415-1422, 2007; Spungin et al., Biogeosciences 15: 3893-39082018) among the cyanobacterial population.

There is a vast, age dependent, difference in the ability of the cyanobacterium *Microcystis* sp. to degrade $H_2O_2$, as its decomposition by older cells is much faster than in younger cells (Daniel et al, Environmental Microbiology Reports 11: 621-629, 2019). Toxic strains are less able to degrade $H_2O_2$ than non-toxic strains (Schuurmans, Harmful Algae 78: 47-55, 2018).

Currently used protocols of *Microcystis* sp. blooms treatments by $H_2O_2$ rests on a single treatment of $H_2O_2$ as high as of 0.7-1 mM (Zhou, Chemosphere 211: 1098-1108 2018; Matthijas et al Water Research 46: 1460-1472, 2012). All algaecide applications currently in use suffer from 3 debilitating shortcomings: (i) dose; (ii) timing of application and (iii) cost of application.

Current treatment protocols of algal blooms using various granular algaecides is inefficient due to the immediate sinking of the particles to the sediments. Thus, the exposure time of the phytoplankton to the active ingredient (AI) is rather short. Consequently, very high concentrations are used with serious environmental implications.

Even when dissolved copper solution or hydrogen-peroxide (in a liquid form) are applied, specialized equipment that is mounted on boats is required. For instance, Lake Delftse hout (NL) with ~200,000 m² and a volume of 705,000 m³, was infested with toxic *Anabaena* sp. and was treated with 5 ppm of 50% liquid $H_2O_2$, which totaled 3.5 tons and took 5 hours to apply (Tsiarta et al., 2017). In another attempt to treat toxic *Alexandrium* bloom in Ouwerkerkse Kreek (NL), a 420,000 m³ water body, the treatment took two days, during which 21 tons of 50% liquid $H_2O_2$ were applied. Total direct costs of this endeavor were €370,000 (Burson et al., Harmful Algae 31: 125-135, 2014). Moreover, special measures were taken in order to store concentrated $H_2O_2$ (delivery on the day of the application by a certified transport company; storage in a restricted area with an entrance on permission only). These types of applications are always carried out by professionals experienced in handling chemicals. The complexity and price-tag linked to these treatments have reduced treatment-candidates almost exclusively to water reservoirs that are smaller than 100,000 m² (Lurling et al., Aquat Ecol 1-21, 2015) and even then—requiring long lead time to treatment, including mobilization and de-mobilization of said equipment, compound and personnel.

The time of treatment is a critical element to its success. Recently developed remote sensing technologies (Kudela, et al., Remote Sens Environ 167: 196-205, 2015), coupled with onsite measurements, enable the recognition of cyanobacterial population at an early stage well before the development of massive blooms (Bertone (ibid.); Hmimina et al., Water Res 148: 504-514, 2019). Due to the presence of phycobilins (with specific absorption spectra) and absence of chlorophyll b in cyanobacteria, it is possible to identify cyanobacterial presence (Bertone (ibid.); Hmimina (ibid.)).

The currently employed treatments of toxic phytoplankton blooms lyse the cells and thereby release massive amounts of toxins into the water body. As intensification of aquatic phytoplankton blooms are a serious ecological problem worldwide, there is a need for novel methodologies to prevent the bloom development rather than await its full dimensions. The preventive treatment proposed here significantly reduces the amount of accumulated toxins and the concentrations of active agent needed, and thus the cost and environmental hazard associated with the treatment.

RELATED ART

Various chemicals are used to mitigate/diminish/kill/inhibit cyanobacteria blooms in water bodies by applying oxidative stress. This is accomplished either directly by singlet oxygen generation, or more commonly by $H_2O_2$ or via reagents that release $H_2O_2$ such as sodium percarbonate or salts of various metals such as copper that induces oxidative stress (Gu et al., 2019). Use of $H_2O_2$ to treat the blooms rests on the fact that cyanobacteria are relatively sensitive to $H_2O_2$, as compared to other phytoplankton species (Tichy and Vermaas, 1999) (Matthijs et al., 2012) (Weenink et al., 2015) (Lin et al., 2018) (Daniel et al., 2019). However, the minimal $H_2O_2$ concentrations needed to kill the cyanobacterial cells seriously affect the populations of various fish, zooplankton and phytoplankton species (other than cyanobacteria). Further, when the $H_2O_2$ was applied to treat a cyanobacteria bloom in a natural water body, the cyanobacteria population started to recover in 6-7 weeks (Matthijs et al., 2012). For that reason, in many parts of the world it is not allowed to treat water bodies with $H_2O_2$ or other active ingredients that induce oxidative stress in cyanobacteria.

Several papers have shown that high concentrations of active agent result in transient elimination of microalgae only.

i. Matthijs and colleagues (2012) (Matthijs et al., 2012) examined the effect of $H_2O_2$ applications in Lake Koetshuis, The Netherlands, and Plexiglas enclosures filled with water therefrom. The lake was infested with the cyanobacterium *Planktothrix agardhii*, a known producer of the toxin microcystins, at concentrations as high as 2-8*10⁵ cells/mL in the lake, and 2*10⁶ cells/mL in the Plexiglas containers. The latter was 110 cm in diameter and 150 cm in height (but only 120 cm plunged in water). Thus, the surface area of the container was about 9500 cm² and the water volume 1140 L. The lowest $H_2O_2$ concentration that sufficed to significantly reduce the *P. agardhii* population was 2.5 mg/L, equivalent to 2.85 gr/m². Already at this $H_2O_2$ concentration, the photosynthetic performance and cell counts of zooplankton population were severely reduced.

ii. The surface area of Lake Koetshuis is about 0.12 km². Matthijs and colleagues (2012) (Matthijs et al., 2012) estimated that the total lake volume was about 240,000 m³. As for the $H_2O_2$ concentration, they used 240 kg $H_2O_2$ for the entire lake, equivalent to 2 gr/m². In lake experiments, the various phytoplankton groups (green algae diatoms, cryptophytes and cyanobacteria) were seriously affected by the treatment and the level of the toxic cyanobacteria was rapidly rising already after 6-7 weeks.

iii. On the basis of their laboratory and field studies, Weenink and colleagues (Weenink et al., 2015) discussed "How much HP ($H_2O_2$) has to be added for selective suppression of cyanobacteria and at which density of the phytoplankton?" They recommend using a minimum of 2.3 mg·L⁻¹ $H_2O_2$ per treatment and that the higher the phytoplankton biomass, the more $H_2O_2$ should be applied.

iv. In a mesocosm experiment, Lin and colleagues (Lin et al., 2018) examined the effect of a range of $H_2O_2$ concentrations (2-12 mg/L) on the population of *Microcystis*, several groups of phytoplankton and of bacterioplankton assemblages. 150 L water samples were withdrawn from Dianchi lake, China and placed in plastic containers. The diameter of the containers was 56 cm (not mentioned in the paper but kindly provided by author Prof. Nanqin Gan). Thus, the container's surface area was 2,462 cm² and the amounts of $H_2O_2$ added was equivalent to 1.22-7.31 gr/m². Lin et al (2018) indicated that "The abundance of *Microcystis* decreased when $H_2O_2$ was applied at doses of 4 mg/L (2.44 gr/m².) and above. The cell density of *Microcystis* did not decrease when the $H_2O_2$ dose applied was 2 mg/L (ANOVA, P >0.05). At 4 mg/L there was a large decline in the population of various other phytoplankton and bacteria.

All of the above studies suffer from one or more of the following drawbacks: inefficient treatment (the cyanobacteria population is not eliminated), transient effect only (the cyanobacteria population is rapidly reestablished) or the dose is too high (above the highest allowed limit for drinking water and/or negatively affecting beneficial fauna in the ecosystem).

There thus remains a need for methods and compositions allowing efficient treatment of cyanobacteria, i.e. treatments allowing a significant and lasting reduction in cyanobacteria efficiency, while being ecologically sustainable, i.e. having minimal effect on other phytoplankton and bacteria and using low doses of active ingredient ("AI").

SUMMARY

The herein disclosed invention enables efficient treatment of cyanobacteria, which reduces the cyanobacteria concentration for a prolonged period of time, essentially without negatively affecting other phytoplankton and bacterial populations, which are important to the ecosystem of the waterbody, while using low doses of AI, thus causing a minimal health hazard when consumed.

The effect is inter alia obtained due to the gradual and continuous/prolonged release of sublethal concentrations of the active ingredient programming the toxic cyanobacteria to cell death while having minimal effect on other beneficial algal species.

The herein disclosed composition and method advantageously allows applying as little as 0.33 kg Sodium percarbonate (or other AI) per 1,000 $m^2$ which is equivalent to 0.11 $gr/m^2$ (i.e. at least 11-fold less than the minimal effective amounts used in the abovementioned studies).

According to some aspects, the present disclosure is directed to compositions for mitigating phytoplankton growth in water bodies, the composition comprising:
i. an active ingredient (also referred to herein as "AI") at a concentration of 80.0-99.5% (w/w)
ii. a coating material at a concentration of 0.5-20% (w/w) wherein the critical surface tension of said hydrophobic composition is between 15-60 dyn/cm and wherein the relative density of the composition, prior to being submerged in water, is higher than 1.0 $g/cm^3$.

According to some aspects, the present disclosure is directed to compositions for mitigating phytoplankton growth in water bodies, the composition consisting essentially of:
i. an active ingredient (also referred to herein as "AI") at a concentration of 80.0-99.5% (w/w)
ii. a coating material at a concentration of 0.5-20% (w/w) wherein the critical surface tension of said composition is between 15-60 dyn/cm and wherein the relative density of the composition, prior to being submerged in water, is higher than 1.0 $g/cm^3$.

According to some embodiments, the composition is formulated such that the effective specific gravity declines below 1 $g/cm^3$ in 0.01-120 minutes after being submerged in water leading to surfacing of the composition to the water surface (FIG. 1).

The inventor of the present application unexpectedly found that compositions comprising an AI properly encapsulated with a hydrophobic coating may, despite having a specific gravity higher than that of water (>1.0 $g/cm^3$), float or at least resurface within 0.01-120 min after having been submerged in water and remain floating even after mixing. This is further exemplified in the examples section.

The inventor of the present application unexpectedly found that where the specific gravity of a given hydrophobic coating material is less than 1.0 g/ml and that of the AI used larger than 1.0 g/ml, raising the proportion of the coating material in the encapsulated composition slowed or even eliminated the floating of the AI material. As an example (see FIG. 1), a composition of 95% (w/w) of copper based-AI granules and 5% (w/w) coating material floated slower (had a longer resurfacing-time) than a composition made of 99% (w/w) of the same AI and 1% (w/w) coating material (FIG. 1). Further, a 75% (w/w) copper-based AI with 25% (w/w) coating material failed to float and sunk to the bottom of the water reservoir. This is further exemplified in the examples section.

According to some embodiments, the floating composition advantageously provides a very high percentage of AI within the final product, requiring minimal product (i.e. algaecide) input in order to achieve an optimal lethal concentration in the water. As a result, the herein disclosed composition reduces the needed AI dose for treatment, the overall operational costs and the time-to-treatment and thus provides a superior sustainable course of treatment with minimal environmental footprint.

It was further found that a range of 15-60 dyn/cm surface tension of the coating material is critical for acquiring buoyancy and that the less coating (w/w) applied, the faster the resurfacing took place and a larger fraction of the AI was found in the surface (FIG. 1).

Advantageously, the acquired buoyancy repeated itself when various AI compounds were encapsulated, such as, but not limited to, calcium hypochlorite, sodium percarbonate, copper sulfate pentahydrate, aluminum sulfate and potassium permanganate.

Moreover, different coating materials provided similar beneficial and unexpected results as long as the critical surface tension of the coating material was within the range of 15-60 dyn/cm.

Without wishing to be bound by any theory, a buoyancy of a single non-wetting powder on the water surface is defined by the interaction of different forces: buoyancy, curvature force, and gravitation. In the case of sphere-like particles, it can be expressed as $Mg/2\sigma L \sin(\Theta) < 1.0$, where "M" is the mass of a particle, "g" is an acceleration of gravity, "L" is a contact length, a is a surface tension of water, $\Theta$ is a tangency angle of the floating body, and 1.0 is the relative density of water measured in $g/cm^3$. Hydrophobicity may play a major role by altering the water-particle interactions and thus the angle of the floating body. When large hydrophobic particles of 5-1,500 µm are placed on the water surface they may aggregate (possibly due to strong hydrophobic attractions) and form a meniscus at the water surface. When the water-tension breaks (depending on various parameters such as, but not exclusively, the water purity, temperature and others), the composition may descend to the bottom but resurface thereafter.

Without wishing to be bound by any theory, the surprising resurfacing of the composition having a specific gravity higher than 1.0 g/ml, may be due to the hydrophobic characteristics of the composition.

As a further advantage, the herein disclosed formulation may be formulated to have a buoyancy enabling the composition to stay submerged below the surface of the water system yet without sinking to the bottom (also referred to herein as a partial buoyancy), e.g. to remain at a depth of 0 m-1.5 m, preferably between 0.2-1.0 m below the surface of the water system when applied. This may be particularly advantageous for pre-bloom treatment as the majority of the algal/cyanobacterial population are found below the surface as compared to the floating mats characterizing algal bloom (Bertone (ibid.); Kudela (ibid.).

According to some embodiments, the semi-buoyant compositions can be formulated for slow or extended release of the AI. As demonstrated herein, it was advantageously found that extended exposure of the phytoplankton to the algaecide, caused cell death even when the highest concentration of the algaecide in the water body is below its known lethal concentrations. It was further found that the sublethal concentration of the AI alone killed the cyanobacteria while having minimal impact on green algae and even allowed the recovery of green algae and enabled them to outcompete remaining toxic phytoplankton (see FIG. 18 below).

According to some aspects, the present disclosure is also directed to methods for controlling phytoplankton growth in water bodies by treating them preventively, i.e. prior to the appearance of dense population often termed "bloom" and/or prior to formation of algal mats on the surface of a water body.

Advantageously, the herein disclosed treatment, conducted prior to the development of algal or cyanobacterial blooms, minimizes the amount of toxins released to the water body by lysing cells. As an example, a treatment of a *Microcystis* sp. population as proposed here may release up to 0.01 µg/L microcystin-LR to the water body, i.e. 100-fold lower than the maximal allowance by the WHO (https://www.who.int/water_sanitation_health/water-quality/guidelines/chemicals/microcystin/en/). This is in sharp contrast to conventional treatments applied when the blooms are already established, where microcystin-LR level can exceed 45 µg/L (Sakai, Scientific World Journal DOI:10.1155/2013/838176, 2013).

According to some embodiments, the method may include sedimentation of granules within the photic zone of the water body (the layer of water in a water body that is exposed to at least 1% of the light intensity at the surface) that varies by season, geology, geography and the phytoplankton population density. According to some embodiments, the method comprises administering a semi-buoyant composition formulated to remain within 0.02-1.0 m from the water surface. This is particularly advantageous for pre-bloom treatments during which a large proportion of the algal/cyanobacterial population are typically found 0.05-1.0 m below the surface (Bertone (ibid.); Kudela (ibid.).

According to some embodiments, there is provided a composition for mitigating, inhibiting, and/or eliminating phytoplankton growth in a waterbody, the composition comprising or consisting essentially of an active ingredient at concentrations of 80.0-99.5% (w/w) of the composition and a coating material at concentration of 0.5-20% (w/w) of the composition; wherein the critical surface tension of said composition is between 15-60 dyn/cm and wherein the relative density of the composition, prior to being submerged in water, is above 1.0 g/cm$^3$ and wherein the relative density of the composition decreases below 1 g/cm$^3$ 0.5-60 minutes after being submerged in water.

According to some embodiments, the composition comprises or consists essentially of an active ingredient at concentrations of 90.0-99.5% (w/w) of the composition and a coating material at concentration of 0.5-10% (w/w) of the composition.

According to some embodiments, the composition may include granules having a first concentration of coating material and granules having a second concentration of coating material. This may advantageously ensure a prolonged duration of release of the active ingredient in that the active ingredient is initially released from granules having a lower concentration of coating material and subsequently from granules having a higher concentration of coating material.

As anonlimited example, the composition may include granules having 1% w/w coating material (and 99% w/w active ingredient) and include granules having 3% w/w coating material (and 97% w/w active ingredient), thereby extending the release of the active ingredient over time.

According to some embodiments, the composition may be devoid of an encapsulated floating agent.

According to some embodiments, the coating material comprises a Behenic acid Octadecanoic acid, 2,3-dihydroxypropyl ester; Glyceryl distearate; Hexadecanoic acid; Octadecanoic acid; Fatty acids; Fatty acids, C8-18 and C18-unsatd.; Fatty acids, C16-18 and C18-unsatd.; Fatty acids, C8-18 and C18-unsatd., potassium salts; Fatty acids, C8-18 and C18-unsatd., sodium salts; Glycerides, C8-18 and C18-unsatd. mono- and di-; Glycerides, C14-18 mono- and di-; Fatty acids, coco, polymers with glycerol and phthalic anhydride, a wax, paraffin, rosin, silicone derivative or a derivative thereof or any combination thereof.

According to some embodiments, the composition may have a melting temperature of 50-90° C. According to some embodiments, the composition may have a solidifying temperature below 20° C.

According to some embodiments, the coating material has an acid value of 3-8 mg KOH per gram. This may advantageously provide an optimum adhesion between the shell (coating material) and the core (active ingredient).

According to some embodiments, the coating material comprises a wax, paraffin, a fatty acid or any combination thereof.

According to some embodiments, the concentration of the active ingredient is about 80-99.5%. According to some embodiments, the concentration of the active ingredient is about 95-99.5%.

According to some embodiments, the concentration of the coating material content is in the range of about 0.5-20%. According to some embodiments, the concentration of the coating material content is in the range of about 0.5-5%. According to some embodiments, the concentration of the coating material is less than 20% (w/w) of the composition. According to some embodiments, the concentration of the coating material is less than 15% (w/w) of the composition. According to some embodiments, the concentration of the coating material is less than 10% (w/w) of the composition. According to some embodiments, the concentration of the coating material is less than 5% (w/w) of the composition.

According to some embodiments, the composition comprises granules having different concentrations of coating material. For example, according to some embodiments, the composition comprises a first portion of granules comprising 0.5-2% w/w coating material mixed with a second portion of granules having 3-10% coating material. According to some embodiments, the composition further comprises granules having a 6.5%-20% w/w coating material. The different concentrations of coating material may advantageously allow prolonged release of the algaecide when submerged in a waterbody and thus bring about prolonged exposure of the cyanobacteria to the algaecide (e.g. $H_2O_2$). Without being bound by any theory, the prolonged exposure causes death, primarily programmed cell death, of the cyanobacteria (rather than necrotic cell death), advantageously following a single treatment with the composition despite using small doses of algaecide. This is unlike the necrotic death commonly used where a much larger (at least 10-fold) concentration of AI is required.

According to some embodiments, when the encapsulated AI used is $H_2O_2$ the concentration applied may be in the range of $10^{-7}$-$10^{-12}$ ppm depending on the density of the phytoplankton population and the depth of the water body. It is understood that such concentration is significantly lower than that typically used in non-encapsulated compositions, namely 2-4*$10^{-6}$ ppm (see for example Matthijs et al., 2012; Weenink et al., 2015; Lin et al., 2018).

According to some embodiments, the critical surface tension of the composition is in the range of 20-45 dyn/cm or 30-45 dyn/cm.

According to some embodiments, the active agent comprises an oxygen-releasing agent, a chlorine releasing agent, a bromine-releasing agent, an iodine-releasing agent, a peroxide-based compound, a copper releasing agent, a manganese-releasing agent, an aluminum releasing agent, or any combination thereof.

According to some embodiments, the composition may be formulated such that the active ingredient is released into the water system at water temperatures below 45° C. within 24 hours of being applied.

According to some embodiments, the composition may be formulated as granules with a granule size in the range of 10-1,500 µm or in a range of 300-1,500 µm or in a range of 1-10 mm.

According to some embodiments, the composition is configured to stay submerged at a depth of about 0.02-1 m below the surface of the water system after having been applied and/or after or during resurfacing/refloating (see examples below).

According to some embodiments, there is provided a method for preventing and/or inhibiting development of a toxic phytoplankton bloom in a water body, the method comprising identifying areas within the water body a toxic phytoplankton biomass above 8,000 cells/mL or a chlorophyll-a concentration above 3 μg/L and applying a buoyant algaecide composition to the area of the water body, such that the concentration of the algaecide within the area is below a lowest lethal dose.

According to some embodiments, the applying may efficiently prevent an algal or cyanobacterial bloom when applied prior to the development of the bloom. According to some embodiments, the method may essentially eliminate algal or cyanobacterial infections when applied following appearance of algal or cyanobacterial scum.

According to some embodiments, the applying is done when the chlorophyll-a concentration measured elsewhere in the water body is above 3 μg/L. According to some embodiments, the applying is done when the chlorophyll-a concentration measured elsewhere in the water body is above 3 μg/L and below 10 μg/L.

According to some embodiments, the water body comprises a reservoir, an ocean, a lake, a dam, a pond, an estuary, a gulf, a sea, or a river.

According to some embodiments, the method further comprises applying a second dose of the buoyant algaecide composition to the area 0.5-10 hours after the first applying thereof.

According to some embodiments, the algaecide composition is configured to release the algaecide for at least 2 hours after application thereof.

According to some embodiments, the composition is formulated to stay submerged at a depth of about 0.02-1 m below the surface of the water body.

According to some embodiments, the water body is a water body with earlier events of toxic phytoplankton blooms. It is thus understood to one of ordinary skill in the art that while the composition and method of applying same is suitable for use in water bodies with a first event, it was surprisingly found that even water bodies suffering from numerous events of toxic phytoplankton bloom may be successfully treated using the herein disclosed method and/or composition.

According to some embodiments, the composition applied comprises 80.0-99.5% (w/w) active ingredient and 0.5-20% (w/w) coating material, as essentially disclosed herein.

According to some embodiments, the composition applied comprises granules having different concentrations of coating material. For example, according to some embodiments, the composition comprises a first portion of granules comprising 0.5-2% w/w coating material and a second portion of granules having 3-10% coating material. According to some embodiments, the composition further comprises granules having a 10%-20% w/w coating material. This may advantageously allow prolonged release of the algaecide and thus a prolonged exposure of the cyanobacteria to the low algaecide (e.g. $H_2O_2$) concentration.

According to some embodiments, the coating material has a melting point above 45° C., above 50° C., or above 55° C. Each possibility is a separate embodiment.

According to some embodiments, the coating material has a solidifying point below 20° C., below 30° C., or below 40° C. Each possibility is a separate embodiment.

According to some embodiments, the critical surface tension of said composition is between 15-60 dyn/cm and wherein the relative density of the composition, prior to being submerged in water, is above 1.0 g/cm³.

According to some embodiments, the size of the granules is within a range of 0.3-15 mm, 0.3-1 mm or 1-10 mm. Each possibility is a separate embodiment.

According to some embodiments, the composition/the granules have a viscosity of 6-8 cP at 70° C.

According to some embodiments, there is provided a method for treating, inhibiting, and/or eliminating phytoplankton growth in water bodies, the method comprising:
i. performing inspection for presence and density of a phytoplankton (e.g. according to specific phytoplankton's pigments),
ii. defining an infected area by coordinates,
iii. applying a buoyant composition locally, up wind— while having the wind in the back, opposite to the infected area, so that the wind pushes the floating algaecide composition particles towards and/or with the infected area, thereby treating, inhibiting and/or eliminating the development of phytoplankton bloom.

According to some embodiments, the treatment may be preventive, thus enabling treatment with a minute dose of AI. As used herein, the terms "preventive treatment" and "prophylactic treatment" may be used interchangeably and may refer to a treatment performed in early stages of phytoplankton contamination.

According to some embodiments, the composition may be applied by emptying containers containing the composition at one or more "dropping zones". According to some embodiments, the composition may be applied at the dropping zones without requiring mixing, stirring, spraying or otherwise spreading of the composition over the surface of the water system. According to some embodiments, the one or more dropping zones may be at the shore of the water body, thus advantageously obviating the need for using boats or other delivery equipment as essentially shown in FIG. 8A and FIG. 8B herein.

According to some embodiments, the composition may be applied using a "duster" similar to those used for spreading salt pesticides or grains in agriculture. Dusting may be particularly useful when treating large water systems. The formulation can be applied from a boat of any kind without any volume limitation at strategic "dropping" zones from where the compound can travel with the currents and aggregate along algal concentrations.

Large quantities of the composition can be manufactured and packed in siloes of variable sizes (e.g. 10 s of tons). Optionally, the entire silo can be shipped directly to the desired "dropping zone" where it can be deployed. According to some embodiments, a spreader can be built into such a silo to better control the amount and rate of product used in each "dropping zone".

According to some embodiments, the preventive phytoplankton treatment may include applying at least two different photosynthetic microorganism inhibitors e.g. in an alternating order between treatments. As a non-limiting example, two consecutive treatments with $H_2O_2$-based compositions may be done followed by a third treatment with a copper-based composition.

According to some embodiments, a combination of two photosynthetic microorganism inhibitors may be applied in a single treatment, e.g. copper- and $H_2O_2$-based compositions may be applied simultaneously.

According to some embodiments, the combined or alternating action of more than one photosynthetic microorganism inhibitor may (a) prevent accumulation of resistant strains and (b) affect different types of phytoplankton with various sensitivities and (c) reduce the total amount of photosynthetic microorganism inhibitor that is applied. Each possibility is a separate embodiment.

According to some embodiments, the inspection may be remote, such as by buoys, air or space.

According to some embodiments, the preventive phytoplankton treatment (beginning of season) enables using about 2-fold, 3-fold, 5-fold, 10-fold, 15-fold, 20-fold, 50-fold less AI, or any value there between per season as compared with late bloom treatment (also referred to herein as "responsive treatment" or "end of season treatment"). Each possibility is a separate embodiment.

According to some embodiments, if 0.33 kg of the active ingredient e.g. is Sodium percarbonate per 1,000 m$^2$ is applied, this is equivalent to 0.325 gr/m$^2$ (Molecular weight of Sodium percarbonate–$2Na_2CO_3*3H_2O_2$=314 gr, releases 3 molecules of $H_2O_2$ i.e. 102 gr of $H_2O_2$). Accordingly, 1 kg of sodium percarbonate releases 325 gr $H_2O_2$. This corresponds to 0.11 gr/m$^2$ which is 11-fold less than the minimal amounts used in the various studies.

According to some embodiments, the preventive phytoplankton treatment prevents development of a full-scale bloom altogether.

According to some embodiments, the preventive phytoplankton treatment brings about at least a 40% or at least a 60% reduction in phytoplankton biomass after 24 hours. According to some embodiments, the preventive phytoplankton treatment brings about at least an 80% or at least a 90% reduction in phytoplankton biomass after 48 hours.

According to some embodiments, the treatment will change the ratio between cyanobacteria to non-toxic algae by 1.5-fold, by 4-fold, by 10-fold or more within 24-72 hours from initiation of the treatment (vis-à-vis the ratio before treatment). Each possibility is a separate embodiment. According to some embodiments, the ratio may be determined by measuring photosynthetic pigments (that capture the light energy necessary for photosynthesis) as a proxy of specific phytoplankton species such as: chlorophyll-a, chlorophyll-b, chlorophyll-c1, chlorophyll-c2, fucoxanthin, peridinin, phycocyanin, and/or phycoerythrin. Additionally or alternatively, the ratio may be determined spectroscopically by measuring the fluorescence emitted from the photosynthetic pigments or using phytoplankton cell count (microscopy, cell-sorting), or thermal imaging. Each possibility is a separate embodiment. Without wishing to be bound by any theory, the treatment methodology and slow-release composition, disclosed herein, changes the ecological balance in the water body so that cyanobacteria get lysed to otherwise exterminated, followed by which non-toxic algae (which are minimally affected by the sub-lethal dose of the AI) take advantage and proliferate in high numbers. This 'self-healing' mechanism of the water body sustains the treatment and prolongs the results as the non-toxic algae further compete with the cyanobacteria to keep their low numbers at bay.

According to some embodiments, the preventive phytoplankton treatment eliminates or at least significantly reduces the concentration of toxin producing cyanobacteria or algae in the water system.

According to some embodiments, the preventive phytoplankton treatment obviates the need to chlorinate the supplied drinking water.

According to some embodiments, the preventive phytoplankton treatment eliminates bad smell and taste of the water in the water system, which may be particularly advantageous for recreational and aquaculture purposes.

According to some embodiments, the preventive phytoplankton treatment further decreases the population of small planktonic crustaceans (e.g. *Daphnia* sp. or *Copepod* sp. 0.2-5 millimeters in length) that feed on the phytoplankton (e.g. by at least 10%, at least 50% or at least 90% within 1, 7 and 30 days respectively). These organisms that feed on phytoplankton blooms increase the incidence of pipe-clogging. According to some embodiments, the reduced crustacean population lowers the need to apply highly poisonous pesticides (e.g. abamectin) that are typically employed to inhibit, reduce or exterminate the growth of planktonic crustaceans. Advantageously, the preventive phytoplankton treatment may thus reduce the wear and tear of filters and pumps.

According to some embodiments, the preventive phytoplankton treatment further reduces or prevents occurrence of Enterobacteriaceae species.

Advantageously, due to the above benefits of the preventive phytoplankton treatment, the present invention reduces the overall seasonal operation costs by as much as 90%, thus making treatment of large water bodies (>10 km$^2$) feasible technically, environmentally and financially.

According to some embodiments, the method further comprises, conducting a follow-up inspection in order to decide if additional treatment is necessary. Each possibility is a separate embodiment. Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

According to some embodiments, there is provided a method for preventing and/or eliminating development of phytoplankton blooms in water bodies larger than 5,000 m$^2$, the method comprising applying a buoyant algaecide composition to about 0.001-20% of the surface at a pre-defined location enabling the wind to passively disperse the composition.

According to some embodiments, the method further comprises an initial step of inspection for development of a phytoplankton bloom, wherein the inspection comprises determining phytoplankton biomass and/or concentration. According to some embodiments, applying the composition comprises applying the composition preventively prior to formation of a visible/detectable phytoplankton bloom and/or scum. As used herein, the term "visible" may refer to a bloom/scum floating at the surface of the water body visible to the naked eye or to bloom detectable by laboratory analysis.

According to some embodiments, the method comprising applying a buoyant composition at a pre-defined "dropping zone" upwind of an infected area of the water body, such that wind and current cause the composition to drift towards and/or together with the phytoplankton bloom; thereby mitigating, inhibiting, preventing and/or eliminating the development of phytoplankton bloom.

According to some embodiments, applying the composition comprises applying the composition when the biomass of the phytoplankton in the "dropping zone" is below 10 µg/L chlorophyll-a or about 20,000 cells/mL or less.

According to some embodiments, the composition is applied such that the concentration of the algaecide in the water system/body is in the range of $10^{-7}$-$10^{-12}$ ppm, on average, depending on the depth, within 24 hours of its application over essentially the entire volume of the water body (e.g. at least 85%, at least 90%, or at least 95% of the water body). According to some embodiments, the composition is applied such that the algaecide in the water body is below $10^{-9}$ ppm, on average, over the entire volume of the water body within 72 hours, within 48 hours, or within 24 hours. According to some embodiments, the herein disclosed preventive treatment may be conducted prior to an algal or cyanobacterial bloom and thus ensures that the amount of toxins measured in the water system is lower than 0.1 µg/L (10% of the maximal allowable level by WHO).

According to some embodiments, applying the composition comprises applying the composition to about 0.001-25% of the surface of the water body. According to some embodiments, applying the composition comprises applying the composition to about 0.001-15% of the surface of the water body. According to some embodiments, applying the composition comprises applying the composition to about 0.001-10% of the surface of the water body.

According to some embodiments, the water body is a reservoir, an ocean, a lake, a dam, a pond, an estuary, a gulf, a sea, or a river. According to some embodiments, the water body has a size of at least 10,000 m². According to some embodiments, the water system has a size of at least 1 km², or 10 km², or 100 km².

According to some embodiments, the composition is formulated to stay submerged within the photic zone of the water body. In some embodiment the photic zone has a depth of about 0.1-1 m below the surface of the water body, about 0.02-1.5 m below the surface of the water body, about 0.1-2 m below the surface of the water body, or about 0.1-5 m below the surface of the water body.

The term "photic zone" as used herein refers to the layer of water in a water body that is exposed to sunlight. According to some embodiments, the depth of a photic zone may be up to 1 meter, up to 10 meters or up to 100 m depth. The depth of the photic zone depends on the density of the phytoplankton population. For example, it may range between 0.1 m during a massive algal bloom to 100 m when the phytoplankton population is less than 10,000 cells/ml. The depth of a photic zone of a water body may further vary depending on the time of the day, season, geology or geography of the water body.

According to some embodiments, the composition is configured to release the algaecide for at least 0.5 hour, at least 1 hour, at least 2 hours or at least 6 hours, after application thereof. Each possibility is a separate embodiment.

According to some embodiments, the composition is applied prior to an algal or cyanobacterial bloom, such that the amount of toxins measured in the water body, including in vicinity to the area being applied, within 72 hours, within 48 hours, or within 24 hours from application is lower than 1 µg/L.

According to some embodiments, the composition is formulated to stay submerged at a depth of about 0.02-2 m below the surface of the water body.

According to some embodiments, the composition comprises 80-99.5% w/w algaecide 0.5-20% w/w coating material. According to some embodiment the rate of Active Ingredient (AI) release from the buoyant algaecide composition can be adjusted by altering the relative proportions of the AI and coating material. The smaller the fraction of the coating material the faster the release of the AI.

According to some embodiment the duration of the phytoplankton treatment with the AI is determined by the rate of AI release from the buoyant algaecide composition. The slower the release the longer the exposure of the phytoplankton to the AI.

According to some embodiment the longer the exposure of the phytoplankton to the active ingredient (AI) the larger is the fraction of phytoplankton cell death.

It is understood that the number of subsequent treatments, as well as the frequency of the treatments (the time between subsequent treatments), may be determined according to the release rate of the AI.

According to some embodiments, the composition is applied such that the average concentration of the algaecide in the water system declines to $10^{-9}$-$10^{-15}$ ppm within 24 hours, over essentially the entire volume of the water body (e.g. at least 85%, at least 90%, or at least 95%).

According to some embodiments, applying the composition comprises applying the composition to about 0.001-25% of the surface of the water body. According to some embodiments, applying the composition comprises applying the composition to about 0.001-15% of the surface of the water body. According to some embodiments, applying the composition comprises applying the composition to about 0.001-10% of the surface of the water body.

According to some embodiments, the slow release of the active material within the photic zone exposes the toxic cyanobacteria to the AI for a duration that is sufficient to activate massive cell death.

Another advantage of the coated composition is that it is far less corrosive to the airplanes that deliver or distribute or spread it over the treated water body.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

In addition to the exemplary aspects and embodiments described above, further aspects and embodiments will become apparent by reference to the figures and by study of the following detailed descriptions.

BRIEF DESCRIPTION OF THE FIGURES

The invention will now be described in relation to certain examples and embodiments with reference to the following illustrative figures so that it may be more fully understood. The patent or application file contains at least one drawing executed in color. Copies of this patent or patent application publication with color drawing(s) will be provided by the Office upon request and payment of the necessary fee.

FIG. 5A-FIG. 5B show representative photographs of sodium percarbonate placed in 15 ml vials containing 5 grams of uncoated AI (left) and 5 grams of coated-AI (right), at time 0 (FIG. 5A). After vigorous mixing (FIG. 5B) all coated formulation sank and immediately started to resurface.

FIG. 6 shows two 10-liter cylinders filled with water and supplemented with sediment after one hour of treatment with the same dose of copper sulfate pentahydrate. The left cylinder was treated with the granules of copper sulfate pentahydrate (mimicking standard treatment), which immediately sank into the sediment. The right cylinder was treated with a buoyant copper-based formula, coated with 2.5% floating agent, that floated on the water and released its content into the water column (top-down).

FIG. 7 shows a comparison graph between three approaches conducted over one year, at 50-hectare ponds: (1) no treatment: solid black line indicates a natural development of cyanobacterial bloom infestation; (2) Responsive, late stage treatment according to: solid gray line indicates sharp drops in bloom levels after every treatment with 50 kg/ha totaling 1.75 tons over one year; (3) preventive treatment: dotted black line and arrows indicating eight sequential treatments of 5 kg/he totaling 200 kg—a reduction of ~90% in the total dose.

FIG. 8A and FIG. 8B show photographs of part of the shore where two persons deposited the 500 kg product within a very short time. The compound was deposited in large piles of ~5-10 kg each in the water (FIG. 8A). Soon enough, within 10-30 min, the granules started to resurface (i.e. designated by the arrows) and moved with the wind towards the algal scum (FIG. 8B). Total time for the piles to dispersed themselves was 24-36 hours.

(FIG. 12B) three days post-treatment, no toxin-producing cyanobacteria were captured. The phytoplankton captured by microscopic imaging was mostly beneficial green algae, mainly *Diatom* sp. and *Chlamydomonas*-like sp. Few *Spirulina* sp., a nontoxic cyanobacterium, were also captured.

DETAILED DESCRIPTION

Figure 1A:
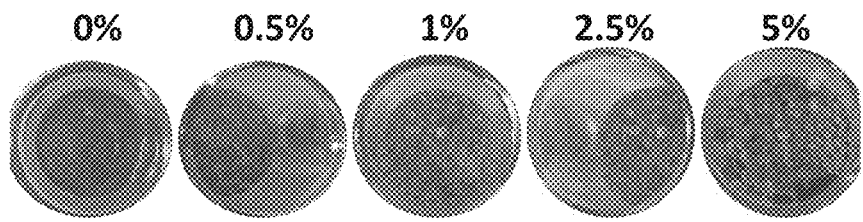
FIG. 1A-FIG. 1C show time series photographs of 10 ml vials containing 5 grams of coated granular copper sulfate with 0, 0.5, 1, 2.5 or 5% (w/w) of coating material. The raw copper salt ("0% coating") sunk immediately after dispersion. In contrast, the coated copper composition sunk to the bottom and resurfaced within a short time. (A) photograph of the water surface 2 hours after dispersion of copper-based AI compositions containing (from left corner) 0%, 0.5%, 1%, 2.5% and 5% (w/w) of coating material; (B) a time series pictures of the vials from 5 min to 24 hours, as marked; (C) exemplification from (B) of the remains of the granules at bottom of the vials after 5 min, 30 min, 2 hours and 5 hours.
Figure 1B:
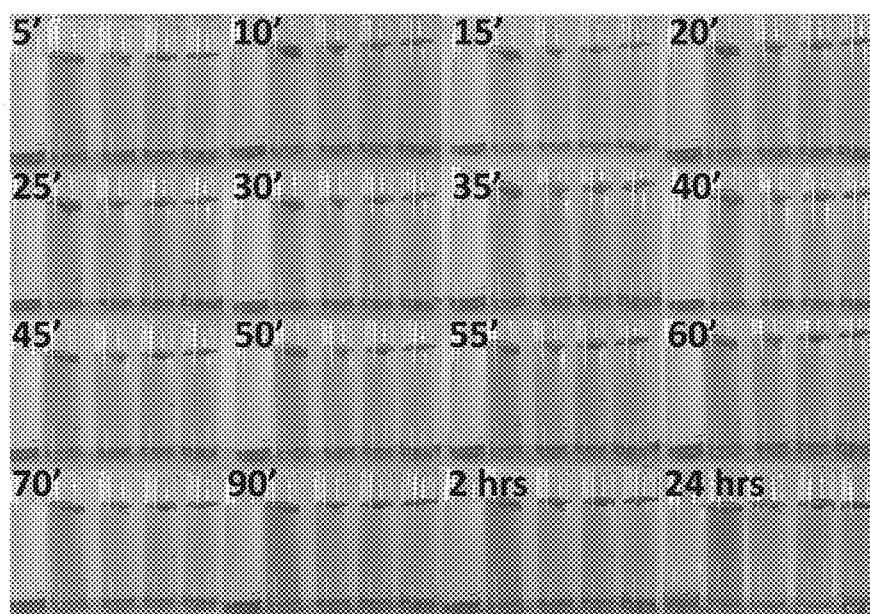
Figure 1C:
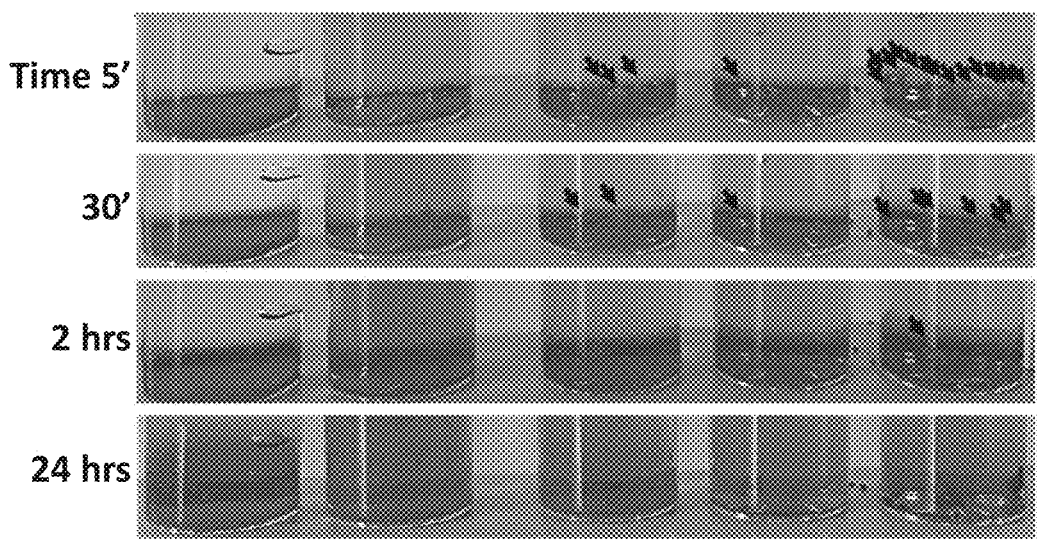

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

Definitions

The term "phytoplankton" as used herein refers to Microorganisms performing photosynthesis in aquatic environments. The two major groups of phytoplankton are: (1) Cyanobacteria (also referred to as "Blue-green Algae") and (2) Microalgae (i.e. eukaryotic photosynthetic microorganisms).

Non-limiting examples of cyanobacterial species include: *Microcystis* sp., *Nodularia* sp., *Cylindrospermopsis* sp., *Lyngbya* sp., *Planktothrix* sp., *Oscillatoria* sp., *Schizothrix* sp., *Anabaena* sp., *Pseudanabaena* sp., *Aphanizomenon* sp., *Umezakia* sp., *Nostoc* sp., *Spirulina* sp. Their known cyanotoxins include: microcystins, nodularins, anatoxin, cylindrospermopsins, lyngbyatoxin, saxitoxin, and lipopolysaccharides.

Non-limiting examples of algae include: *Karenia* sp., *Gymnodinium* sp., dinoflagellates, *Prymnesium* sp. (aka golden algae). Their list of toxins includes paralytic shellfish poisoning (PSP), neurotoxic shellfish poisoning (NSP), aplysiatoxins, BMAA, brevetoxin, and ptychodiscus.

As used herein, the term "non-toxic algae" refers to algae which do not produce toxins of a kind or at a concentration hazardous to the ecosystem of the water system. According to some embodiments, non-toxic algae do not produce paralytic shellfish poisoning (PSP), neurotoxic shellfish poisoning (NSP), aplysiatoxins, BMAA, brevetoxin, and ptychodiscus.

As used herein, the term "non-toxic cyanobacteria" refers to cyanobacteria, which do not produce toxins of a kind or at a concentration hazardous to the ecosystem of the water system. According to some embodiments, non-toxic cyanobacteria do not produce microcystins, nodularins, anatoxin, cylindrospermopsins, lyngbyatoxin, saxitoxin, and lipopolysaccharides.

As used herein, the term "Phytoplankton Blooms" refers to a population explosion of phytoplankton in waterbodies. The phenomenon is identified when large quantities of buoyant photosynthetic micro-organisms float at the photic depth (where light intensity is higher than 1% that of the surface water) or on the water surface. It refers to the phenomenon when cyanobacteria or microalgae species multiply their biomass in a logarithmic manner over a period of one day, a week, two-weeks, a month, a season.

The terms "algicides" or "algaecides" as used herein refers to compounds capable of exterminating, lysing, killing, inhibiting growth of, inhibiting proliferation of, inhibiting photosynthesis or otherwise reducing/preventing/inhibiting/treating phytoplankton infestation. Non-limiting examples of suitable algaecides include oxidizers (e.g. hypochlorite, $H_2O_2$ or $H_2O_2$ producing chemicals such as sodium percarbonate), phosphate chelating agents (e.g. alum-salts, bentonite clay), copper-based compounds, potassium permanganate and combinations thereof. According to some embodiments, the algaecide may include a combination of algaecides, such as, but not limited to, $H_2O_2$ and copper-based algaecides, which combination may have a synergistic effect, thus enabling reducing the overall usage of chemicals. As used herein, the term "lowest lethal dose" refers to the least amount of drug that can produce death of the phytoplankton when exposed to the algaecide for less than 24 h.

Without being bound by any theory, in addition to the effect of abiotic parameters, sensitivity of cyanobacteria to $H_2O_2$ depends on the specific conditions in each water body, such as the phytoplankton composition and its ability to decompose $H_2O_2$ (Weenink et al., 2015, Combatting cyanobacteria with hydrogen peroxide: a laboratory study on the consequences for phytoplankton community and diversity. Front Microbiol 6: doi:10.3389/fmicb.2015.00714). Accordingly, in preparation for a treatment, the threshold concentration above which the active ingredient (e.g. $H_2O_2$) kills the phytoplankton/cyanobacteria when applied as a single dose is determined.

According to some embodiments, the lethal dose may be determined as follows:
1. Collect cells e.g. using a phytoplankton net.
2. Collect the cells (e.g. by rinsing the net with a small volume of distilled water, such as 100 mL (the exact volume depends on the cell density)).
3. Withdraw a sample to vials (e.g. 1 mL) and centrifuge vials.
4. Apply a range of $H_2O_2$ concentration using a stock solution (e.g. 0, 0.5, 1, 2, 4 and 10 mg/L).
5. Vortex and wait 30-60 min.
6. Spin the vials and measure the absorbance at 620, 680 and 730 nm wavelengths. This enables assessment of the amount of pigments released from dying cells.

The term "waterbody" as used herein refers to any type of reservoir, aquaculture, basin, salt or fresh or brine waters, ocean, gulf, sea, stagnant water or river.

The term "water system" as used herein may refer to include any body of water whether natural or manmade.

As used herein, the terms "Active ingredient (AI)", "core material", "raw material" and "technical compound" refer to any reactive compound that is designated to cause reactivity against microorganisms in the water system. Non-limiting examples of AIs include detergents, antibiotics, anti-photosynthetic, algaecides. According to some embodiments, the AI may be any phytoplankton or zooplankton inhibiting agent.

In some embodiments, the term "mitigation" as used herein refers to reducing phytoplankton biomass by 90%, 80%, 70%, 60%, 50% or more within 30 min, 90 min, 6 hours, 1 day, 2 days, or one week, from treatment application. Each possibility is a separate embodiment.

As used herein, the terms "necrosis" and "necrotic cell death" may be used interchangeably and refer to a form of cell injury which results in the premature death of cells due to, for instance, a high level of poison or toxins that impairs cell function/structure.

As used herein, the term "Program cell death (PCD)" refers to cell death induced by an internal or external signal(s) mediated by an intracellular genetically controlled program.

In some embodiments, the term "season" as used herein refers to the period of time extending between initiation of phytoplankton logarithmic growth (defined either by cell-density levels that increase by more than 2-fold within a period of time: one day, a week, two-weeks, or a month); or when cell density exceeds 8 µg chlorophyll-a/L or 8,000 phytoplankton cells/ml; and the end of logarithmic growth (when cell-density levels hardly change or even naturally drop below 10 µg chlorophyll a/L or 20,000 phytoplankton cells/ml). It should be noted that in some cases, in some places, based on the foregoing criteria a "season" may not be an annually recurring phenomenon, rather one that takes place all year round.

The term "periodic treatment" as used herein refers to a treatment every 24 hours, 2 days, a week every 2-4 weeks, once a month, once a year, or twice a year. Each possibility is a separate embodiment. According to some embodiments, the periodic treatment may be seasonal treatment.

The term "infected area" as used herein refers to an area that is contaminated with phytoplankton biomass in a cell density that is about or larger than 10 µg/L chlorophyll-a concentrations or above 20,000 phytoplankton cells/ml. The area can be defined using probes or standard-laboratory extraction methods to detect photosynthetic pigments (that capture the light energy necessary for photosynthesis) as a proxy of specific phytoplankton species such as: chlorophyll-a, chlorophyll-b, chlorophyll-c1, chlorophyll-c2, fucoxanthin, peridinin, phycocyanin, phycoerythrin. Detection can also be done spectroscopically, by the fluorescence emitted from the photosynthetic pigments or using phytoplankton cell count (microscopy, cell-sorting), or thermal imaging. Determination and mapping of the infected area can be done using drones or a satellite aerial inspection via multispectral imaging. It can also be done with a probe connected to a boat that crisscrosses the water body to effectively monitor the water surface.

The term "critical surface tension" as used herein refers to the surface tension of solid bodies, powders etc. It can be measured as a surface tension of liquids (or liquid mixtures) that leads to the complete spreading of liquid on the solid surface. The critical surface tension value is measured in dyn/cm. It can be defined by a matrix of liquids mixed together to change the water surface tension strength as exemplified also by (Ghahremani et al., Der Chemica Sinica 2: 212-221, 2011). Different materials have different surface tension values, for example Parafines ~23-24 dyn/cm, Teflon, ~19-21 dyn/cm, Polyvinul chloride ~45 dyn/cm etc.

As used herein, the terms "floating composition" and "buoyant composition may be interchangeably used and refer to compositions formulated for floating on the surface and/or for staying submerged in the water column without sinking to the bottom of the water system. According to some embodiments, the floating/buoyant composition may be essentially equally dispersed throughout the water column. According to some embodiments, the floating composition may be formulated to reach a certain depth (above ground) of the water column (e.g. 0.01-5 cm below the surface, or 10-200 cm below the surface or 20-100 cm below the surface).

As used herein, the term "acid value" refers to mass of KOH in mg that is required to neutralize 1 g of a fatty acid, such as one gram of the coating material.

As used herein, the term "consisting essentially of" with regards to the herein disclosed compositions refers to compositions including less than 2% w/w, less than 1% w/w, less than 0.5% w/w, less than 0.1% w/w, less than 0.05% w/w or less than 0.01% w/w of ingredients other than those disclosed. Each possibility is a separate embodiment.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising", when used in this specification, specify the presence of stated features, steps, operations, but do not preclude or rule out the presence or addition of one or more other features, steps, operations, or groups thereof. According to some embodiments, the term "comprising" may be replaced by the term "consisting essentially of" or "consisting of".

The terms "about" and "approximately" refer to a reasonable variation from a stated amount that retains the ability to achieve one or more functional effect to substantially the same extent as the stated amount. The term may also refer herein to a value of plus or minus 10% of the stated value; or plus or minus 5%, or plus or minus 1%, or plus or minus 0.5%, or plus or minus 0.1%, or any percentage in between.

Compositions

According to some aspects, the present disclosure is directed to compositions for mitigating, treating, inhibiting, ameliorating, and/or eliminating phytoplankton growth in water bodies, the composition comprising:

i. an active ingredient at concentration of 80.0-99.5% (w/w).

ii. a coating material at concentration of 0.5-ive % (w/w). wherein the critical surface tension of the composition is between 15-60 dyn/cm and wherein the relative density of the composition, prior to being submerged in water, is above 1.0 g/cm$^3$.

According to some embodiments, the composition is formulated such that the relative density decreases to below 1.0 g/cm$^3$ 0.1-60 minutes, 0.25-60 minutes, 5-60 minutes, or 10-60 minutes after being submerged in water. Each possibility is a separate embodiment.

According to some embodiments, the composition consists of the active ingredient and the coating material i.e. includes essentially only the listed ingredients (active ingredient and coating) and less than 40%, less than 20%, less than 10%, less than 5%, 1% or 0.1% of other ingredients (impurities or inert materials). Each possibility is a separate embodiment.

In some embodiments, the critical surface tension of the composition is between 20-45 dyn/cm, or more specifically 28-32 dyn/cm. Each option represents a separate embodiment of the invention. According to some embodiments, the critical surface tension of the composition is about 30 dyn/cm. According to some embodiments, the critical surface tension of the composition is about 35 dyn/cm.

In some embodiments, the concentration of the active ingredient is 75-99.5%, more specifically 80-99%, or more specifically 95-99%, each option representing a separate embodiment of the invention. In some embodiments, the active ingredient is a photosynthetic microorganism inhibitor. In other embodiments, any active ingredient desired to be formulated in a buoyant composition may be formulated according to the present invention.

According to some embodiments, the active ingredient may include any active ingredient, including any type of water disinfectant, capable of treating, inhibiting and/or eliminating, mitigating growth of aquatic pests such as phytoplankton blooms.

Non-limiting examples of suitable active ingredients include oxygenic-releasing agents, chlorine releasing agents, bromine-releasing agents, iodine-releasing agents, peroxide-based compounds, copper releasing agents, manganese-releasing agents, aluminum releasing agents, photosynthesis inhibitors, and any combination thereof.

Specifically, the active agent may be or include sodium percarbonate, copper sulfate pentahydrate, calcium hypochlorite, sodium dichloroisocyanurate, alum salts, titanium dioxide, phthalimido-peroxy-hexanoic acid, quaternary ammonium compounds, sodium hypochlorite, chlorine, bronopol, glutaral, alkyl*dimethyl benzyl ammonium chloride* (50% c14, 40% c12, 10% c16), alkyl*dimethyl benzyl ammonium chloride*(60% c14, 30% c16, 5% c18, 5% c12), 1-(alkyl*amino)-3-aminopropane monoacetate*(47% c12, 18% c14, 10% c18, 9% c10, 8% c16, 8% c8), trichloro-s-triazinetrione, sodium dichloro-s-triazinetrione, sodium dichloroisocyanurate dehydrate, sodium bromide, poly(oxyethylene(dimethyliminio)ethylene(dimethyliminio)ethylene dichloride), 2-(thiocyanomethylthio)benzothiazole, isopropanol, sodium chlorate, sodium n-bromosulfamate, mixture with sodium n-chlorosulfamate, 1,3-dibromo-5,5-dimethylhydantoin, dodecylguanidine hydrochloride, tetrakis(hydroxymethyl)phosphonium sulphate (thps), 1-bromo-3-chloro-5,5-dimethylhydantoin, sodium chlorite, potassium permanganate, ammonium bromide, copper triethanolamine complex, chlorine dioxide, 2,2-dibromo-3-nitrilopropionamide, 5-chloro-2-methyl-3(2 h)-isothiazolone, sodium dichloroisocyanurate dehydrate, silver, silver sodium hydrogen zirconium phosphate (ag0.18na0.57 h0.25zr2(po4)3), amino acids (such as but not limited to: arginine, glutamine, L-lysine, methionine), copper ethanolamine complex, methyldodecylbenzyl trimethyl ammonium chloride 80% and methyldodecylxylylene bis(trimethyl ammonium chloride) 20%, lanthanum, aluminum sulfate, 2,4-Dichlorophenoxyacetic acid (2,4-D), 1,1'-Ethylene-2,2'-bipyridyldiyliumdibromide (Diquat dibromide), 1-methyl-3-phenyl-5-[3-(trifluoromethyl)phenyl]pyridin-4-one (fluridone), N-(phosphonomethyl)glycine (glyphosate), 5-(methoxymethyl)-2-(4-methyl-5-oxo-4-propan-2-yl-1H-imidazol-2-yl)pyridine-3-carboxylic acid (Imazamox), (RS)-2-(4-Methyl-5-oxo-4-propan-2-yl-1H-imidazol-2-yl)pyridine-3-carboxylic acid (Imazapyr), [(3,5,6-Trichloro-2-pyridinyl)oxy]acetic acid (Triclopyr), Endothall (3,6-endoxohexahydrophthalic acid as potassium salt or amine salt) or any combination thereof. Each possibility is a separate embodiment.

In some embodiments, the concentration of the coating material may be in the range of about 0.5-20% (w/w) of the composition, 0.5-15% (w/w) of the composition, 0.5-25% (w/w) of the composition, 1-20% (w/w) of the composition, 0.5-5% (w/w) of the composition or any other suitable range within the range of 0.1-40% (w/w) of the composition. Each option represents a separate embodiment of the invention.

According to some embodiments, the coating material may have a partition coefficient (log P) of above 1, above 1.5 or above 2. Each possibility is a separate embodiment.

According to some embodiments, the concentration of the coating material is less than 30% (w/w), less than 20%, less than 10% (w/w) of the composition, less than 5% (w/w) of the composition, less than 2% (w/w) of the composition or less than 1% (w/w) of the composition. Each possibility is a separate embodiment.

According to some embodiments, the coating material may include one or more compounds selected from the group consisting of cellulose derivatives, ground plant biomass, saturated hydrocarbons, resinous materials, foam, natural or synthetic latex, waxes, paraffin, rosin, hydrophobic materials, superhydrophobic material, fatty acids and their derivatives and silicone derivatives or any other suitable compound or combination of compounds having the herein disclosed desired critical surface tension. Each possibility is a separate embodiment.

According to some embodiments, the coating material may be or include a fatty acid. According to some embodiments, the fatty acid may be a naturally occurring fatty acid. According to some embodiments, the fatty acid may be an unbranched chain. According to some embodiments, the fatty acid may have an even number of carbon atoms, from 4 to 28. According to some embodiments, the fatty acid may be long-chain fatty acids (LCFA) with aliphatic tails of 13 to 21 carbons. According to some embodiments, the fatty acid may be saturated. According to some embodiments, the fatty acid may be unsaturated. According to some embodiments, the fatty acid may be a triglyceride.

According to some embodiments, the coating material may be or include a wax. As used herein, the term wax refers to organic compounds that are lipophilic, malleable solids at ambient temperatures, typically having a melting point between 55-90° C. According to some embodiments, the wax may be natural or synthetic. According to some embodiments, the wax may be an animal wax, such as bee wax or a plant wax, such as carnauba wax. According to some embodiments, the coating material may be or include paraffin.

Non-limiting examples of suitable coating materials include: Decanoic acid, sodium salt; Octadecanoic acid, ammonium salt; Glycerides, animal, reaction products with sucrose; Glycerides, palm-oil, reaction products with sucrose; Glycerides, tallow, reaction products with sucrose; Glycerides, vegetable-oil, reaction products with sucrose; Fatty acids, tall-oil, maleated, compds. with triethanolamine; Dodecanoic acid, potassium salt; Xanthylium, 3-[(2,6-dimethylphenyl)amino]-6-[(2,6-dimethylsulfophenyl)amino]-9-(2-sulfophenyl)-, inner salt, sodium salt (1:1); Siloxanes and silicones, 3-[(2-aminoethyl)amino]propyl Me, di-Me, methoxyterminated; Di-2-ethylhexyl azelate; Tetraethoxysilane, polymer with hexamethyldisiloxane; Poly(oxy-1,2-ethanediyl), alpha-phenyl-omega-hydroxy-, styrenated; 9-Octadecanoic acid 2-(2-hydroxyethoxy)ethyl ester; Isoamyl butyrate; Benzenesulfonic acid, coctadecyl-, sodium salt; Fatty acids, C18-unsatd., dimers, hydrogenated, polymers with ethylenediamine, olyethylene-polypropylene glycol 2-aminopropyl Me ether and polypropylene glycol diamine. The minimum number average molecular weight is 51300; Sulfuric acid, monooctyl ester; Siloxanes and silicones, 3-aminopropyl Me, Me stearyl; Octadecanoic acid, ester with 1,2,3-propanetriol; 9-Octadecenoic acid (Z)—, 2,3-dihydroxypropyl ester; Octadecanoic acid, 2-hydroxyethyl ester; Isopropyl stearate; Behenic acid; Stearyl alcohol; Hexanedioic acid, polymer with N-(2-aminoethyl)-1,3-propanediamine, aziridine, (chloromethyl)oxirane, 1,2-ethanediamine, N,N"-1,2-ethanediylbis? 1,3-propanediamineU, formic acid and alpha-hydro-omegahydroxypoly(oxy-1,2-ethanediyl); Siloxanes and silicones, 3-hydroxypropyl Me, ethers with polyethylene glycol mono-Me ether; Stearyl dimethyl benzyl ammonium chloride; Octadecanoic acid, 2,3-dihydroxypropyl ester; Octadecanoic acid, butyl ester; Butyl stearate; Fatty acids, canola-oil; Octanoic acid; Castor oil, hydrogenated, polymer with adipic acid, ethylenediamine and 12-hydroxyoctadecanoic ac; Phenyl didecyl phosphite; Hexanedioic acid, polymer with 2,2-dimethyl-1,3-propanediol, 1,6-hexanediol, hydrazine, 3-hydro; 9-Octadecanoic acid, monoester with oxybis(propanediol); Poly(oxy-1,2-ethanediyl),α-undecyl-ω-hydroxy-, branched and linear; Poly(oxy-1,2-ethanediyl), α-(4-nonylphenyl)-ω-hydroxy-, branched; Siloxanes and Silicones, di-Me, 3-hydroxypropyl Me, 3-hydroxypropyl group-terminated, ethoxylated propoxylated; Octadecanoic acid, 2-2, bis(hydroxymethyl)-1,3-propanediyl ester; 9-Octadecenoic acid, 12-hydroxy-, (9Z,12R)—, monoester with 1,2,3-propanetriol; Glyceryl distearate; Fatty acids, coco, reaction products with 2-((2-aminoethyl)amino)ethanol, bis(2-carboxyethyl) deri; Sorbitan monolaurate; Sorbitan monostearate; Decanoic acid, calcium salt; Fatty acids, tall oil, polymers with bisphenol A, epichlorohydrin, ethylenemanuf.-by-product di; Glyceryl tris(12-hydroxystearate); Siloxanes and silicones, di-Me, Bu group- and 3-((2-methyl-1-oxo-2-propenyl)oxy)propyl group-te; Fatty acids, C18-unsatd., trimers, compounds with oleylamine; Sodium lauryl sulfate; Lauryl sulfate; Siloxanes and silicones, di-Me, polymers with silica-1,1,1-trimethyl-N-(trimethylsilyl) silanamine hydrolysis products and silicic acid trimethylsilyl ester; Octadecanoic acid, calcium salt; Fatty acids, C18-unsatd., trimers, reaction products with triethylenetetramine; Siloxanes and silicones, 3-aminopropyl Me, di-Me, [[(3-aminopropyl) ethoxymethylsilyl]oxy]-terminated, 4-hydroxybenzoates; Siloxanes and silicons, hydroxy Me, Me octyl, Me(gamma-omega-perfluoro C8-14-alkyl)-oxy, ether; Trisiloxane, 1,1,1,3,5,5,5-heptamethyl-3-octyl-; Cetyl stearyl octanoate; 9-Hexadecenoic acid; Phenyl tris(trimethylsiloxy)silane; Octadecanoic acid, 2-ethylhexyl ester; Fatty acids, tall-oil, esters with polyethylene glycol mono(hydrogen maleate), compounds with amides from diethylenetriamine and tall-oil fatty acids; Siloxanes and silicones, di-Me, hydroxy Me, ethers with polypropylene glycol mono-Bu ether; Dodecanoic acid, zinc salt; Polypropylene glycol stearyl ether; Silane, (3-chloropropyl)trimethoxy-; 9-Octadecenoic acid (9Z)—, diester with 1,2,3-propanetriol; Lauryl methacrylate polymer; Butyl acrylate-hydroxyethyl acrylate-methyl methacrylate copolymer; Butyl acrylate, 2-hydroxyethyl methacrylate, methyl methacrylate and styrene copolymer; Butyl methacrylate, 2-ethylhexyl acrylate and styrene copolymer; Hexadecanoic acid, diester with 1,2,3-propanetriol; Hexadecanoic acid, monoester with 1,2,3-propanetriol; Sorbitan tristearate; Dodecylphenol; Dodecylbenzenesulfonic acid, diisopropylamine salt; Dodecylbenzenesulfonic acid, triethylamine salt; Silane, triethoxyoctyl-; 2-Ethylhexyl 12-hydroxystearate; Hexadecanoic acid, 2-ethylhexyl ester; 2-Ethylhexyl monohydrogen phosphate; Magnesium dodecyl sulfate; Octadecanoic acid, tridecyl ester; Octadecanoic acid, monoester with 1,2,3-propanetriol; Dodecanoic acid, octadecyl ester; Silane, trimethoxy(2,4,4-trimethylpentyl)-; C8-12 triglycerides; Trisiloxane, 1,3,3,5-tetramethyl-1,1,5,5-tetraphenyl-; Sodium dodecylnaphthalene sulfonate; Tetradecanoic acid, magnesium salt; Heptadecanoic acid; Octadecanoic acid, magnesium salt; Octadecanoic acid, zinc salt; Hexadecanoic acid; Octadecanoic acid; Octadecanoic acid, 12-hydroxy-, homopolymer, octadecanoate; Fatty acids, coco; Fatty acids, vegetable-oil; Glycerides, tallow sesqui-, hydrogenated; Fatty acids, tall-oil; Fatty acids, tallow; Fatty acids, tallow, hydrogenated; Fatty acids, soya, ethoxylated; Fatty acids, coco, ethoxylated; Siloxanes and silicones, di-Me, Me Ph; Siloxanes and Silicones, di-Me, hydroxy-terminated, ethoxylated; Siloxanes and silicones, Me 3,3,3-trifluoropropyl; Poly(methylhydrosiloxane); Polydimethylsiloxane, methyl end-blocked; Chlorinated wax; Petroleum wax; Paraffins (petroleum), normal C5-20; Fatty acids, tall-oil, polymers with glycerol, pentaerythritol, phthalic anhydride and rosin; Glycerides, mixed mono- and di-; Fatty acids; Fatty acids, C8-18 and C18-unsatd.; Fatty acids, C16-18 and C18-unsatd.; Fatty acids, C8-18 and C18-unsatd., potassium salts; Fatty acids, C8-18 and C18-unsatd., sodium salts; Glycerides, C8-18 and C18-unsatd. mono- and di-; Glycerides, C14-18 mono- and di-; Fatty acids, coco, polymers with glycerol and phthalic anhydride; Silanes and siloxanes, 3-cyanopropyl Me, di-Me, 3-hydroxypropyl Me, ethers with polyethylene-polypropylene glycol mono-Me ether; Siloxanes and silicones, di-Me, 3-hydroxypropyl Me, ethers with polyethylenepolypropylene glycol mono-Me ether; Silicone-glycol copolymer; Siloxanes and silicones, di-Me, 3-hydroxypropyl Me, ethers with polyethylenepolypropylene glyc; Dimethyl siloxane polymer with silica; Siloxanes and silicones, di-Me, Me vinyl; Siloxanes and silicones, di-Me, hydroxy-terminated, ethers with polypropylene glycol mono-Bu eth; Siloxanes and silicones, ethoxy Me; Glycerides, palm-oil mono- and di-, hydrogenated, ethoxylated; Glycerides, C16-22; Siloxanes and silicones, di-Me, Me hydrogen, reaction products with polyethylene glycol monoacet; Siloxanes and silicones, di-Me, Me hydrogen, reaction products with polyethylene-polypropylene glycol monoacetate allyl ether; Siloxanes and Silicones, di-Me, di-Ph, Me Ph, polymers with Me Ph silsesquioxanes; Siloxanes and Silicones, di-Me, Me Ph, polymers with Me Ph silsesquioxanes; Siloxanes and Silicones, di-Ph, Me Ph, polymers with Me Ph silsesquioxanes; Fatty acids, coco, diesters with polyethylene glycol; Glycerides, C14-18 mono- and di-, ethoxylated; Fatty acids, tall-oil, esters with ethylene glycol; Glycerides, coco mono- and di-, ethoxylated; Glycerides, soya mono-; Fatty acids, corn-oil; Fatty acids, cottonseed-oil; Fatty acids, soya; Fatty acids, tall-oil, polymers with ethylene glycol, glycerol, isophthalic acid, pentaerythritol and propylene glycol; Fatty acids, tallow, hydrogenated, dimers, diketene derivs.; Fatty acids, tallow, hydrogenated, ethoxylated propoxylated; Fatty acids, linseed-oil; Glycerides, C16-18 and C18-unsatd. mono- and di-; Siloxanes and silicones, Me octyl; Silane, dichlorodimethyl-, reaction products with silica; Fatty acids, tall-oil, diesters with polypropylene glycol; Fatty acids, tall-oil, sesquiesters with sorbitol, ethoxylated; Siloxanes and silicones, di-Me, 3-hydroxypropyl Me, ethoxylated; Siloxanes and silicones, di-Me, 3-hydroxypropyl Me, ethoxylated propoxylated; Siloxanes and silicones, di-Me,[(methylsilylidyne)tris(oxy)tris-, hydroxy terminated, ethers with polyethylene-polypropylene glycol monobutyl ether; Fatty acids, coco, hydrogenated; Siloxanes and silicones, di-Me, 3-hydroxypropyl Me, ethers with polyethylene glycol mono-Me eth; Fatty acids, tall-oil, esters with ethoxylated sorbitol; Fatty acids, tall-oil, polymers with glycerol, isophthalic acid and rosin; Siloxanes and Silicones, di-Me, Me hydrogen, reaction products with polypropylene glycol monoallyl ether; Glycerides, C14-22 mono-; Glycerides, C14-22 mono-, acetates; Siloxanes and silicones, di-Me, 3-hydroxypropyl Me, Me 2-(7-oxabicyclo[4.1.0]hept-3-yl)ethyl, ethers with polyethylene-polypropylene glycol mono-Me ether; Glycerides, mixed decanoyl and octanoyl; Siloxanes and Silicones, polyoxyalkylene-; Polyglyceryl oleate; Polyglyceryl stearate; or any combination thereof. Each possibility is a separate embodiment.

According to some embodiments, the coating material may be or include Behenic acid; Octadecanoic acid, 2,3-dihydroxypropyl ester; Glyceryl distearate; Hexadecanoic acid; Octadecanoic acid; Fatty acids; Fatty acids, C8-18 and C18-unsatd.; Fatty acids, C16-18 and C18-unsatd.; Fatty acids, C8-18 and C18-unsatd., potassium salts; Fatty acids, C8-18 and C18-unsatd., sodium salts; Glycerides, C8-18 and C18-unsatd. mono- and di-; Glycerides, C14-18 mono- and di-; Fatty acids, coco, polymers with glycerol and phthalic anhydride;

According to some embodiments, the coating material may include any compound having one or several of the following attributes: (a) composed of inert compound/s by the inert ingredients approved for use in pesticide products as listed by the US EPA (https://www.epa.gov/pesticide-registration/inert-ingredients-overview-and-guidance); (b) does not chemically react with the AI; (c) low cost; (d) biodegradable; (e) enable the AI to interact with the water system and to release its content over time at water temperatures below 45° C.; (f) coating (w/w) percent of the total composition should be below 20%, preferably below 10% or more preferably below 5%; (g) no by-product of the coating or the combination of the coating with the AI cause environmental hazardous; (h) sustained shelf life (humidity, high temperature during shipping), preferably over 1 year (depending on the AI); (i) coating melting temperature between 50-90° C.; coating is solid above 20° C. Each possibility is a separate embodiment.

According to some embodiments, the granule size is such that an optimal tradeoff between buoyancy (the smaller the granule, the less it weighs, the more likelihood it remains on the water surface) and solubility (the smaller the granule, the larger its surface area, hence the faster it dissolves). Thus, the granule size should be optimized to ensure fast resurfacing while on the one hand allowing release of the AI and on the other preventing it from diffusing into the water surface at early stages of the resurfacing phase.

According to some embodiments, the composition has a form of granules such as, but not limited to, percarbonate granules.

According to some embodiments, the granule size is in the range of 50-150 μm, 150-1500 μm, 200-1000 μm, 0.3-15 mm or 1-10 mm. In principle, the larger the granules are, the less coating required. Each possibility is a separate embodiment.

According to some embodiments, the granule size of the AI may be adjusted such that the composition remains at a depth of 0.02-2 m, 0.1-1.5 m, 0.2-1 m or 0.2-0.5 m or any other suitable range within the range of 0.01 and 2 m below the surface of the water system. Each possibility is a separate embodiment, thus making the composition partially buoyant or semi-buoyant. According to some embodiments, at least 99%, 95%, 90%, 85%, 80%, 75%, 70%, 65%, 60%, 55%, 50% of the applied composition may remain semi buoyant for at least 20 minutes, at least 30 minutes, at least 1 hour or at least 2 hours after having been applied and/or after having resurfaced. Each possibility is a separate embodiment. Advantageously, due to the semi-buoyancy of the composition, it is particularly suitable for preventive treatment of early stages of algal infestation during which the pelagic algae are typically found below the surface of the water system, i.e. prior to formation of algal mats on the surface of the water body.

Methods of Applying the Composition

According to some embodiment, there is provided a method for treating, inhibiting, and/or eliminating phytoplankton growth in water bodies, the method comprising:
  i. performing inspection for presence of a phytoplankton (e.g. according to specific phytoplankton pigments),
  ii. defining an infected area by coordinates,
  iii. applying a buoyant composition locally, off-wind, opposite to the infected area, so that the wind pushes the floating algaecide particles towards the bloom;
thereby treating, inhibiting, ameliorating and/or eliminating the phytoplankton growth.

According to some embodiments, the treatment may be prophylactic, thus enabling treatment with minute doses of active ingredient. As used herein, the term "prophylactic treatment" may refer to a treatment performed in early stages of phytoplankton bloom. According to some embodiments, early stages of phytoplankton bloom may refer to a phytoplankton concentration of 10 μg/l or below, 5 μg/l or below, or 1 μg/l or below. Each possibility is a separate embodiment. According to some embodiments, early stages of phytoplankton bloom may refer to a phytoplankton concentration 20,000 phytoplankton cells/ml or below, 8,000 phytoplankton cells/ml or below, or 5,000 phytoplankton cells/ml or below. Each possibility is a separate embodiment.

According to some embodiments, the buoyant composition may be the herein disclosed buoyant composition comprising an active ingredient (e.g. photosynthetic microorganism inhibitor) at concentration of 80.0-99.5% w/w and a coating material at concentration of 0.5-20% w/w; wherein the critical surface tension of the composition is between 15-60 dyn/cm and wherein the relative density of the composition, prior to being submerged in water, is above 1 g/cm$^3$. However, other buoyant compositions such as, but not limited to, compositions comprising at least one floating agent and at least one active ingredient may also be used and are thus within the scope of this disclosure.

According to some embodiments, applying the buoyant composition comprises applying the composition such that a concentration of the active ingredient is less than $999 \cdot 10^{-9}$-$10^{-15}$ ppm in the aquatic system.

According to some embodiments, applying the buoyant composition comprises applying the composition to 0.001-10% of the surface of an aquatic system off-wind, and opposite to the infected area.

According to some embodiments, the prophylactic phytoplankton treatment may include applying at least two photosynthetic microorganism inhibitors e.g. in an alternating order between treatments. As a non-limiting example, two subsequent treatments with $H_2O_2$-based compositions may be done followed by a third treatment with a copper-based composition.

According to some embodiments, a combination of two photosynthetic microorganism inhibitors may be applied in a single treatment, e.g. copper- and $H_2O_2$-based compositions may be applied simultaneously.

According to some embodiments, the combined or alternating action of more than one photosynthetic microorganism inhibitor may (a) prevent accumulation of resistant strains and (b) affect different types of phytoplankton with various susceptibilities and (c) reduce the total amount of photosynthetic microorganism inhibitor that is applied. Each possibility is a separate embodiment.

According to some embodiments, the buoyant composition moves together with the bloom in the aquatic system.

According to some embodiments, the method comprises periodically treating the aquatic system with the buoyant composition at a concentration of less than $999 \cdot 10^{-9}$-$10^{-15}$. According to some embodiments, the method comprises periodically treating the aquatic system with the buoyant composition at a concentration of less than the lowest lethal dose of the algaecide.

According to some embodiments, the prophylactic phytoplankton treatment (beginning of season) enables using about 2-fold, 3-fold, 5-fold, 10-fold, 15-fold, 20-fold, 50-fold less active ingredient, or any value therebetween per season as compared to late bloom treatment (also referred to herein as "responsive treatment" or "end of season treatment"). Each possibility is a separate embodiment.

According to some embodiments, the prophylactic phytoplankton treatment prevents full-scale blooms altogether.

According to some embodiments, the prophylactic phytoplankton treatment brings about at least a 40% or at least a 50% reduction in phytoplankton biomass after 24 hours. According to some embodiments, the prophylactic phytoplankton treatment brings about at least an 80% or at least a 90% reduction in phytoplankton biomass after 48 hours.

According to some embodiments, the treatment will change the ratio between cyanobacteria to non-toxic algae by 2-fold, by 4-fold, by more than 10-fold within 24-72 hours from initiation of the treatment (vis-à-vis the ratio before treatment). Each possibility is a separate embodiment. According to some embodiments, the ratio may be determined by measuring photosynthetic pigments (that capture the light energy necessary for photosynthesis) as a proxy of specific phytoplankton species such as: chlorophyll-a, chlorophyll-b, chlorophyll-c1, chlorophyll-c2, fucoxanthin, peridinin, phycocyanin, and/or phycoerythrin. Additionally or alternatively, the ratio may be determined spectroscopically, by measuring the fluorescence emitted from the photosynthetic pigments or using phytoplankton cell count (microscopy, cell-sorting), or thermal imaging. Each possibility is a separate embodiment. Without wishing to be bound by any theory, the treatment methodology and slow-release composition, disclosed herein changes the ecological balance in the water body so that cyanobacteria get lysed to otherwise exterminated, followed by which non-toxic algae (which are minimally affected by the sub-lethal dose of the AI) take advantage and proliferate in high numbers. This 'self-healing' mechanism of the water body sustains the treatment and prolongs the results as the rising fraction of non-toxic algae further compete with the cyanobacteria to keep their low numbers at bay.

According to some embodiments, the method further comprises applying an additional dose of the same or different active ingredient if the phytoplankton biomass is higher than 10 µg/l.

According to some embodiments, the prophylactic phytoplankton treatment eliminates or at least significantly reduces the concentration of toxins in the water system.

According to some embodiments, the prophylactic phytoplankton treatment eliminates or at least significantly reduces the need to chlorinate water.

According to some embodiments, the prophylactic phytoplankton treatment eliminates or at least significantly reduces bad smell and taste of the water in the water system, which may be particularly advantageous for recreational and aquaculture purposes.

Advantageously, as the algaecide optimally distributes itself vertically as well as spatially, it reduces the overall exposure of living organisms in the water to the active compound and leaves them ample areas upwind or in deeper waters to escape to.

According to some embodiments, the prophylactic phytoplankton treatment further reduces the population of small planktonic crustaceans (e.g. *Daphnia* sp. or *Copepod* sp. 0.2-5 millimeters in length) that feed on the phytoplankton (e.g. by at least 10%, at least 50% or at least 90% within 1, 7 and 30 days respectively). These organisms are a correlated by-product of the phytoplankton bloom which increases the incidence of pipe-clogging. According to some embodiments, the reduced crustacean population reduces, in turn, the need or at least the required concentration of the highly poisonous pesticides (e.g. abamectin) that are typically employed to inhibit, reduce or exterminate the growth of planktonic crustaceans. Advantageously, the prophylactic phytoplankton treatment may thus reduce the wear and tear of filters and pumps.

According to some embodiments, the prophylactic phytoplankton treatment further reduces or prevents occurrence of Enterobacteriaceae species.

Advantageously, due to the above advantages of the prophylactic phytoplankton treatment, the present invention reduces the overall seasonal operation costs by as much as 90%, thus making treatment of large water bodies (>10 km$^2$) feasible technically, environmentally and financially.

According to some embodiments, the composition may be applied using a "duster" similar to those used for spreading salt pesticides or grains in agriculture. Dusting may be particularly useful when treating large water systems. The formulation can be applied from a boat of any kind without any volume limitation at strategic "dropping" coordinates from where the compound can travel with the currents and aggregate along algal concentrations.

Large quantities of the composition can be also manufactured and packed in siloes in variable sizes (10 s of tons). Optionally, an entire silo can be shipped directly to the desired "dropping zone" where it can be deployed. A spreader can be built into such a silo to better control the amount and rate of product used in each "dropping zone".

According to some embodiments, the method includes the performance of follow up assessments of the previously treated-area within a certain period of time, such as within 24 hours, within 2 days or within a week, in order to monitor the treatment's results and respond if, when and where it is required with a supplemental dose. Each possibility is a separate embodiment.

According to some embodiments, the method further comprises, conducting a follow-up inspection every 24 hours, every 2 days, every week, every 2-4 weeks, once a month, once a year, or twice a year in order to decide if additional treatment is necessary. Each possibility is a separate embodiment.

According to some embodiments, the coating process may have one or several of the following attributes:

Simple and affordable, preferably no more than two-steps involved.

Safe to manufacture.

Methods for Preparing the Composition

According to some embodiments there is provided a method of preparing/manufacturing a buoyant composition comprising percarbonate granules, the method comprising heating the AI granules to 45-60° C. during continuous stirring under nitrogen environment in a sealed mixer; heating of hydrophobic coating containing methyl esters of fatty acids (CAS NO 67762-38-3) or methyl esters of higher fatty acids (CAS No. 67254-79-9) to 60-90° C., encapsulating the AI granules by the hydrophobic coating during continuous stirring.

According to some embodiments, the method further comprises cooling the composition to below 40° C. to obtain sodium-percarbonate granules with a solid coating.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—Determination of the Optimal Coating

To determine the optimal percentage of coating required to provide (1) resurfacing of the composition and (2) slow-release of the compound, the following protocol was established.

A given quantity (in weight) of AI was mixed with the coating material (see Table 1). Although it could be expected that more coating would result in better buoyancy, in practice, the opposite happened. Within certain parameters, the less coating material applied, the better buoyancy was achieved. Concurrently, less coating translated into a higher rate of AI release from the composition.

TABLE 1 compositions of copper and a mixture of fatty acids with increasing percentage of the coating (granule size distribution was between 0.3-1.67 mm).

| $CuSO_4 \cdot 5H_2O$, (% weight) | mixture of fatty acids (% weight) | Notes |
|---|---|---|
| 99.5 | 0.5 | FIG. 1A-FIG. 1C |
| 99.0 | 1.0 | |
| 97.5 | 2.5 | |
| 95.0 | 5.0 | |

TABLE 1-continued compositions of copper and a mixture of fatty acids with increasing percentage of the coating (granule size distribution was between 0.3-1.67 mm).

Figures 2, 3A, 3B, 3C, 3D, 3E, 3F, 3G, 3H:
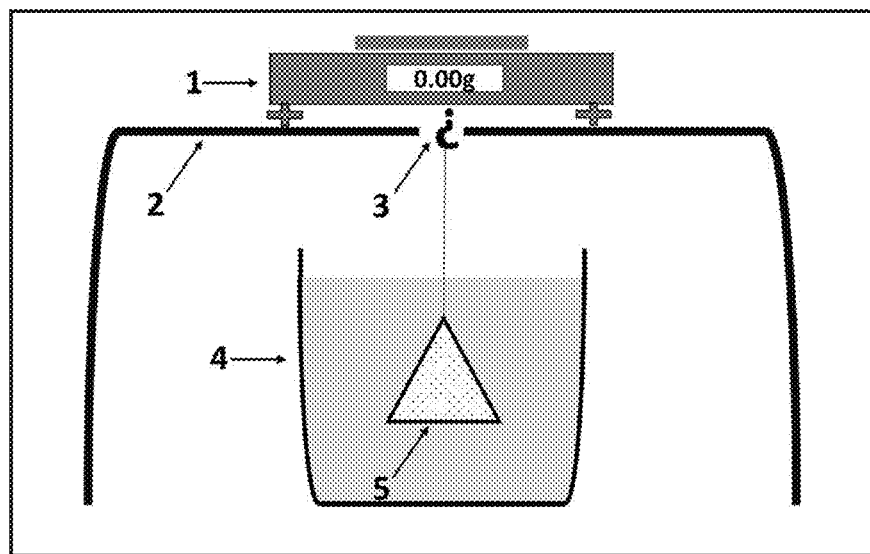
FIG. 2 schematically illustrates an experimental set-up for testing the buoyancy of the herein disclosed compositions, including (1) a balance; (2) a measuring pod with an aperture; (3) an underneath hook to measure weight; (4) a beaker filled with water simulating an aquatic system; (5) a weighing-pan.
FIG. 3A-FIG. 3H show representative time series photography of coated NADCC (97% (w/w) AI and 3% (w/w) coating) floating or during floatation. Note the arrows showing specific samples.
Figure 4:
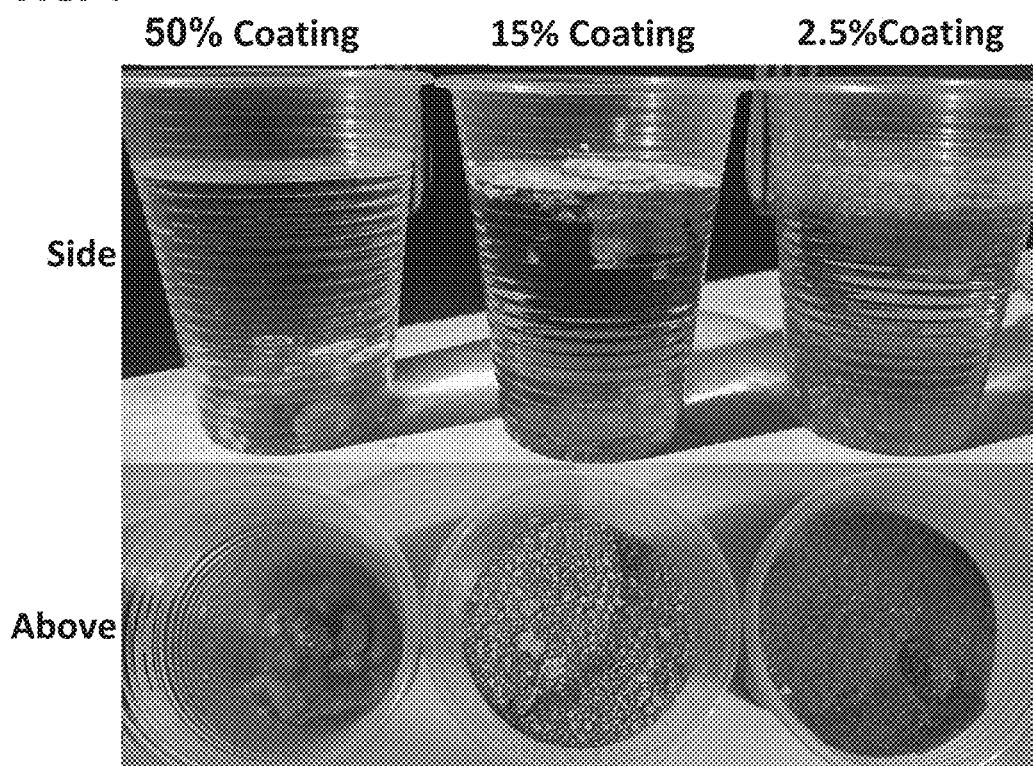
FIG. 4 shows representative photographs of glasses filled with water and the composition detailed in Table 1 with an increased coating percentage (50%, 15%, and 2.5% (w/w) left to right). The pictures were taken 30 min after 25 grams of each composition were placed in the water.

| CuSO$_4$•5H$_2$O, (% weight) | mixture of fatty acids (% weight) | Notes |
|---|---|---|
| 90.0 | 10.0 | |
| 85.0 | 15.0 | |
| 80.0 | 20.0 | |
| 75.0 | 25.0 | Slurry. big agglomerates upon crystallization. Neither release of copper nor resurfacing - even after 3 days under ambient conditions (see FIG. 2). |
| 70.0 | 30.0 | |
| 60.0 | 40.0 | |
| 50.0 | 50.0 | |

Surprisingly, as can be seen from Table 1 above, when the fraction of coating material was 25% or higher was applied to the AI, the final (dry) product lost buoyancy. When submerged under water it failed to resurface. When placed on the water surface it sunk to the bottom. Furthermore, the large amount of the coating inhibited the interaction with the surrounding water and thus prevented solubilization and release of the active material.

In contrast, when the proportion of the coating used was lower (0.5-20% depending on the nature of the material used) the composition was able to resurface despite its specific gravity being higher than 1.0 g/ml. Further, the floating composition agglomerate were able to release its AI content to the surrounding water. More information is provided in the examples below.

The resurfacing phenomenon can be seen in FIG. 1A-FIG. 1C, which show representative time series photographs showing the buoyancy of granular copper coated with 0, 0.5, 1, 2.5 or 5% (w/w) of coating material.

As expected, non-coated active ingredient (0.0% (w/w)) sank immediately to the bottom and quickly dissolved in the water, due to its hygroscopic nature.

Initial application of formulations with 0.5%-5.0% (w/w) resulted in the granules mostly sinking to the bottom (FIG. 1A). However, as can be seen from FIG. 1B and FIG. 1C, within ~30 min, all the granules, which initially submerged, resurfaced and advantageously remained buoyant.

Example 2—Preparation of Sodium Dichloroisocyanurate Buoyant Formulation with a High Concentration of Photosynthetic Microorganism Inhibitor In order to test the buoyancy of the herein disclosed compositions, an experimental set-up, schematically illustrated in FIG. 2, was applied. In this set-up, a laboratory balance 1 (0-2,000±0.1 g) was positioned to measure the weight of a composition placed on a weighing-pan 5 immersed in a beaker filled with water 4. If the composition is non-buoyant (AI without the coating material) an increase in weight is anticipated ('negative control'). Oppositely, if the composition is buoyant, the weight is expected to remain essentially unchanged.

The first composition tested was sodium dichloroisocyanurate (NADCC) 97% (w/w) encapsulated with wax (3%, w/w). The composition was prepared by melting 3 g of wax in a 500 ml beaker. When completely dissolved, the NADCC was placed inside the beaker and mixed vigorously for 20 min in a standard laboratory chemical fume until the temperature of the composition returned to room temperature (22° C.). The surface tension of the composition was measured to be 30 dyn/cm.

As expected, when 9.5 grams of un-encapsulated NADCC was placed on the weighing-pan a ~5.3 g weight increase was observed. However, when 9.6 grams of the coated sample was weighed, the initial weight increase was only 1.5-5% of the original weight—evidently due to semi-buoyancy of the formulation over the weighing-pan. The critical surface tension of the composition was measured and defined at 30 dyn/cm.

FIG. 3A-FIG. 3H represents time-series photography of coated NADCC (97% w/w, AI and 3%, w/w, coating material) of the experiment. Upon applying the composition on the water surface, the composition initially floated (FIG. 3A). However, shortly after application, agglomerates started to form, and a meniscus of the water surface was observed (FIG. 3B outlined in the picture by the black dashes). When the water-tension was broken by vigorous mixing of the water, the composition sank to the bottom within 30 seconds (FIG. 3C-FIG. 3H, follow the arrows). Unexpectedly, within 30 min, the NADCC agglomerates resurfaced. By the end of the trial (within 60 min, not shown in FIG. 3), all aggregates resurfaced.

The rate of chlorine released from the AI: when 1.0 gram of encapsulated product (97.5% AI and 2.5% covering material) were placed in a beaker with 1.0 liter containing distilled water, under ambient room conditions (22° C.), and mixed vigorously it took almost 24 hours to release the entire chlorine to the medium as measured with YSI 9300 photometer. In contrast, when the same test was done using water containing a high organic content, in the form of $10^7$ *Planktothrix* sp. cells per ml, all AI content was released within 2 hours. These data indicated that the rate of AI release from the encapsulated composition is strongly affected by the organic mass content in the water column in addition to physical parameters such as the physical stirring motion in the water.

Example 3—Industrial Preparation of Copper Sulfate Buoyant Formulation with High Concentrations of Photosynthetic Microorganism Inhibitor A final weight of granular copper sulfate pentahydrate of 97.5 kg, with a granule distribution of 0.5-5.0 mm, was preheated to 50° C. in a ribbon mixer designed for powder blending. An amount of 2.5 kg pre-melted mixture of methyl esters of higher fatty acids (CAS No. 67254-79-9), at 70° C., was applied onto the blended mixture. The mixture was then blended for 20 min and the content's temperature then cooled to 22° C. (room temperature). For quality analysis, three samples of 100 grams each were withdrawn from different locations in the batch. The buoyancy of the samples was measured utilizing the experimental setup described in FIG. 2. Advantageously, the samples of the above described coated composition caused a 31%±4% weight increase only. In comparison, non-encapsulated copper showed a 50%±3% weigh increase. The critical surface tension of the composition was measured and defined at 35 dyn/cm.

FIG. 4 shows representative photographs of glasses filled with water and the compositions (as detailed in Table 1) with a decreasing coating percentage (50%, 15%, and 2.5% w/w, left to right). The compositions containing 15% and 2.5% (w/w) coating resurfaced within 30 min, whereas the compositions having 50% (w/w) coating remained on the surface, in crystallized agglomerates that never resurfaced. Further, contrary to the compositions with 2.5% and 15% coat-compositions that released their AI content in less than 24 hours (the exact time required was strongly affected by the organic matter content, as shown also above), the composition with 50% coating failed to release its AI content over more than 3 days. This was in contrast to the increasing amounts of AI released from the 15% and 2.5% coated compositions, as was apparent from the increasingly blueish color of the water column. The water containing the 50% coat-composition remained colorless for at least three days after the time of application.

Example 4—Industrial Preparation of Sodium-Percarbonate Buoyant Formulation with High Photosynthetic Microorganism Inhibitor Concentrations This example details the coating of 98% (w/w) sodium percarbonate (SPC) with 2% (w/w) methyl esters of higher fatty acids (CAS No. 67254-79-9) coating. Since SPC is an oxygenic compound that tends to explode, careful measures were taken. For that, a sealed explosion proof mixer agitator coated with a Teflon layer, and equipped with a vacuum pump for drying purposes, was used. Working temperature was kept at all times under 22° C. In order to melt the coat under ambient conditions, organic solvents (e.g. ethanol, methanol, isopropanol) were used in 1:1 proportion with the coating. The mixture of 1.0 kg coat and 1.0 kg methanol were mixed for 1 hour with 49 kg of sodium percarbonate. Thereafter, the vacuum pump was turned on and sucked all volatile residues from the chamber whilst the mixture was still agitated in the mixer. After two hours, when the compound was completely dry, it was opened and packed in 10 kg plastic boxes. The surface tension of the composition was measured was 35 dyn/cm.

FIG. 5A-5B shows 15 ml vials each containing 5 grams of uncoated AI (left) or 5 grams of a coated-AI sample (right)), at time 0 (FIG. 5A) and after vigorous mixing (FIG. 5B). The uncoated AI sank immediately. In contrast, the coated formulation formed a meniscus at the water surface, partially sank, but resurfaced shortly thereafter. The smaller the coated granules the faster they surfaced.

Example 5—Sedimentation Analysis

Two 10-liter cylinders were filled with water and supplemented with sediment. To one cylinder, granules of copper sulfate pentahydrate (mimicking standard treatment) were added, while a buoyant copper-based composition was added to the other cylinder. As seen from FIG. 6 left image, the copper sulfate pentahydrate granules immediately sank into the sediment. In contrast, when a buoyant copper-based composition (FIG. 6—right image) was added, the composition remained suspended and its content released its content into the water column (top-down).

Example 6—Large Granules Resurface Faster

Two different formulations of granular CuSO4-5H2O were purchased from IQV (https://iqvagro.com/en/). Two granular sizes were tested a) 1.0-10.0 mm and b) 0.280-2.0 mm. The granules were coated with 5% w/w, 10% w/w/ or 20% w/w coating composed of 67.5% fatty acids and 32.5% methyl esters of fatty acids, as essentially described in Example 3.

150 grams of each composition was tested on the bank of a 150,000 m² fresh-water pond, in northern Israel on Jul. 4, 2019. All six formulations were similarly placed on a concrete floor approximately 30 cm below the surface of the pond. All six samples were distributed within 2 min. The maximal time of resurfacing of the compositions was determined visually and was recorded using digital photography. The results are summarized in Table 2.

TABLE 2

| Resurfacing time of compositions | | | | | | |
|---|---|---|---|---|---|---|
| | Granules size | | | | | |
| | 0.280-2.0 mm | | | 1.0-10.0 mm | | |
| % coating (w/w) of the final product | 5% | 10% | 20% | 5% | 10% | 20% |
| Resurfacing start time | 1 min | 5 min | 30 min | 5 min | 7 min | 30 min |
| Max time to resurface for the whole pile | 40 min | 60 min | Within 36 hrs | 30 min | 45 min | Within 12 hrs |

As was observed in Example 1, granules with lower percentage by weight of coating resurfaced faster than those with thicker coatings. Furthermore, larger granules (granule size of 1-10 mm), unexpectedly, resurfaced at a significant higher pace than smaller granules (granule size of 0.280-2.0 mm).

Example 7—Comparison of Methods for Anti-Algal Treatment Methods in Water Reservoirs A trial designed to test the herein disclosed preventive approach in the management of phytoplankton populations was conducted in three ~50 ha wastewater reservoirs, ~15 m deep (280,000 m³), in Israel (see FIG. 7). The ponds were naturally inhabited by a mixed phytoplankton population, which was mainly dominated by *Microcystis* sp. during the bloom season. The reservoirs were tested regularly over a year during morning time using 3-6 biological samples and the data was averaged per each sampling day. Samples were analyzed using a YSI Exo-3 probe which could simultaneously measure: water temperature, pH, specific conductivity, dissolved oxygen, chlorophyll (in general, or chlorophyll-b specifically) as well as phycocyanin (PC) concentrations.

One pond was reserved as a control and was not treated for the entire year. Two other ponds were treated when cyanobacterial cell-density was visual to a naked eye—usually at 40-80 μg/l chlorophyll-a. Treatment was then applied at a rate of 5 g/m² (250 kg/pond or a theoretical concentration of 0.89 ppm). The third pond was treated when phytoplankton biomass increased by 5-fold from its winter baseline. Dose regime was calculated at 0.5 g/m² (25 kg/pond or a calculated concentration of 0.089 ppm). All treatments were made with a buoyant copper sulfate pentahydrate composition (95% w/w AI, 5% w/w coating).

Results: For the natural, undisturbed pond, a cyanobacterial bloom had developed over the year (FIG. 7, black curve): while during wintertime, algal cell-count was low, towards the spring when temperatures rose, the phytoplankton cell-density increased steadily. Later, as weather became hotter and days longer, the population doubled itself every few hours throughout the summertime and a sharp rise in algal cell-numbers was thus evident. This phase came to a halt towards autumn time, and reached a plateau mainly when resources became scarcer, and conditions less favorable. During wintertime, untreated algal cells were dormant only to reappear as conditions improved and repopulation commencing at a higher starting point was observed.

When the pond was treated only according to visual inspection indicating development of cyanobacterial scum, (FIG. 7, gray curve), at the beginning of May, the treatment required a high dose of algaecide to be efficient. Altogether, 1.75 tons were applied, 875% more than that required using the herein disclosed preventive approach (FIG. 7, dotted, black line)—where only 200 kg were used altogether. In addition, using the herein disclosed preventive approach, the total copper concentration measured at the depth of 2 and 5 meters, 2 and 24 hours after treatment, were advantageously found to be below detection level (<0.00 mg/1).

Moreover, it was found that non-preventive treatment resulted in high numbers of crustaceans (such as *Daphnia* sp.) requiring 159 liters of aggressive pesticide control, whereas 90 liters of anti-crustacean compound was required using the herein disclosed preventive approach. Thus, confirming the safety and cost effectiveness from an operational aspect (as anti-crustacean compounds are toxic and sometime even carcinogenic to humans and wildlife).

Example 8—Evaluating the Efficacy of Anti-Cyanobacterial Treatment Method in a Large Water Body A pilot was conducted at a reservoir of ~1,000,000 m$^2$ ($1.5 \times 10^7$ m$^3$, south Israel). The reservoir was infested with an early-moderate toxic cyanobacterial bloom (*Anabaena* sp. mixed with *Aphanizomenon* sp.). According to the water parameters (and considering the infestation level, geological characterizations, local flora combined with the reservoirs' history) it was decided to use a total quantity of 0.5 g/m$^2$ buoyant copper-based composition. Within 24 hours of decision, 500 kg of the formula (95% w/w AI, 5% w/w coating) in 25 kg bags were transferred directly to the water edge—from where two untrained personnel carried and emptied the bags, one by one, onto the water (FIGS. 8A and 8B). The total time of application was <15 min. In some cases, the compound was deposited in the water in large piles (as can be seen in FIG. 8A).

Once in the water, the hydrophobic particles immediately started to float and were carried by the South-Eastern wind towards the cyanobacterial aggregates (FIG. 8B). All compound including the one in the piles resurfaced to the water surface within 24 hours (as some of the piles were bigger than the others). That was done in order to provide a constant release of the active compound onto the water surface and (i) to reduce the cyanobacterial population within 24 hours; and (ii) to achieve a very low (<<0.001 ppb) algicidal residual concentration in the water within 24 hours after the application. Indeed, while the concentration of total copper ions applied was 0.033 ppm, in practice, chemical analysis of water samples withdrawn at 50 cm and 800 cm depth from the middle of the pond, 24 hours after applying the composition on the surface could not detect copper ions. Without being bound by any theory, the disappearance of the copper ions was probably due to them interacting with the abundant organic and non-organic material in the water turning the free ions into inert material (see https://www.who.int/water-_sanitation_health/dwq/chemicals/copper.pdf).

Figure 9:
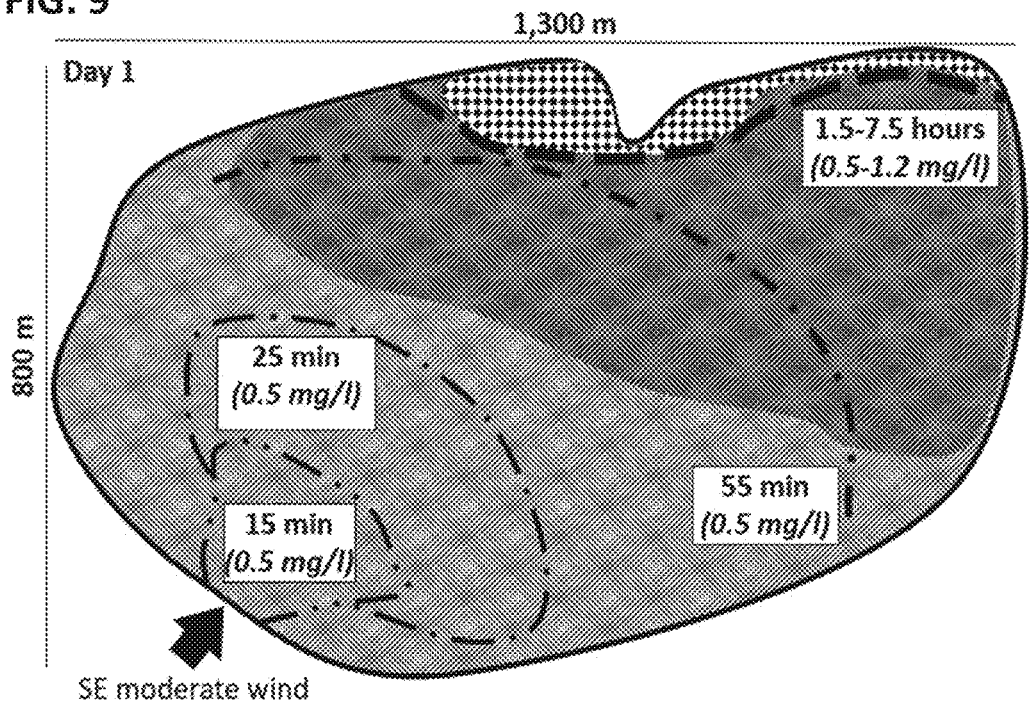
FIG. 9 depicts algaecide concentrations at various areas of an irrigation pond after being applied locally, opposite the target area. Upper figure "Day 1" details measurements that were taken 0-3 hours after treatment. Lower figure, "Day 2" details measurements that were taken 24 hours after treatment. Note the dramatic change in chlorophyll-a concentrations within 24 hours, and the minimal AI concentrations in the water within the first 24 hours of the treatment.
Figure 9:
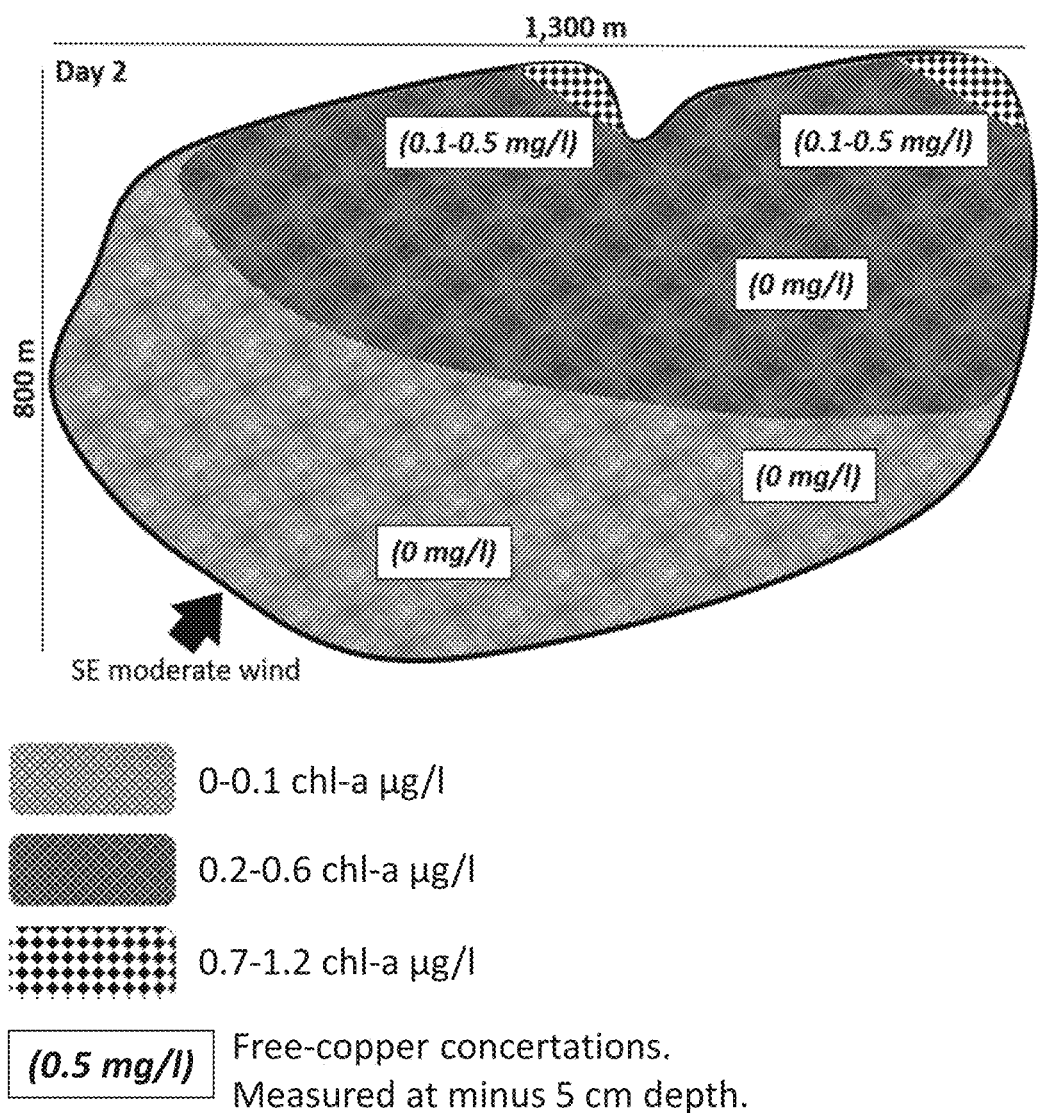

Example 9—Evaluating the Low Concentrations and Minimal Coverage of the Anti-Algal Treatment Method in a Large Irrigation Pond A seasonal treatment of algal bloom at an irrigation pond of ~1.04 km$^2$ with a volume of $2.25 \times 10^6$ m$^3$ (25 m depth) was conducted from February-October 2017 in the northern Negev area, Israel. As detailed in FIG. 9, biomass and total copper concentrations were measured during the first two days to assess efficacy and minimal required AI concentrations. Cyanobacterial biomass was measured using a YSI Exo-3 probe that was supplied with a GPS. The probe was installed on a remotely operated boat that was sampling the whole water body at 30 cm depth and was transmitting the data to a shore laptop. Water samples for total copper concentrations, as well as estimation of particle time travel on the water, as well as final coverage, was done with a kayak and by using a laser distance/range measurer. Total copper concentrations were measured with a YSI 9300 photometer in accordance with manufacturer instructions. For the treatment of the area, 500 kg were applied to the water surface in 10 kg bags (whole treatment lasted 25 min).

After treatment was applied, the copper particles moved along the wind direction and current towards the other end of the pond (as summarized in FIG. 9) where they concentrated at ~10% off the infested area in the vicinity of the cyanobacterial aggregates. In general, algal biomass was reduced by >95% within 24 hours with no harmful effect on local fauna, birds or fish. After the first treatment (end of February 2017) a continuous treatment of 125 kg copper-sulfate buoyant composition was applied every 2-3 weeks when algal concentration exceeded 10 µg/l chlorophyll-a. Under this treatment regime, the algal cell-density did not exceed 10 µg/l chlorophyll-a concentrations even when last measured in the end of October 2017, and the overall amount of copper sulfate used in the floating composition was 1,050 kg (95% w/w copper sulfate granules, 5% w/w coating).

In contrast, in 2016, 7 aerial applications of 2000 kg granular, non-coated. copper sulfate was applied (total of 14 tons); however, the average cyanobacterial concentration remained high (60-80 µg/L chlorophyll-a). Similarly, during 2015, 6 aerial applications of non-coated granular copper sulfate were applied, altogether a total of 8,000 kg; however, the average chlorophyll-a concentration was 100-200 µg chlorophyll-a/L), Thus, it was concluded that treatment with the herein disclosed buoyant composition enabled maintaining low chlorophyll-a levels, much lower than those measured in 2015-2016 while lowering the amount of copper applied by at least 80%, and thus dramatically reducing overall cost and ecological impact of copper ions.

When summing up the data from day 1 and day 2 (FIG. 9), the theoretical concentrations of copper was calculated to be below $2.2 \times 10^{-10}$ ppm, on average, over the entire volume of the water body ($2.25 \times 10^9$ liter), for day 1 and below $4.4 \times 10^{-11}$ ppm on average, over the entire volume of the water body for day 2.

The superiority of the herein disclosed method and composition is particularly surprising in view of other studies of phytoplankton treatment which claim that abundance of *Microcystis* decreases only when $H_2O_2$ is applied at doses of 4 mg/L and above, and that a high *Microcystis* cell density rapidly reappears after completion of the treatment (11 days when a $H_2O_2$ dose of 2 mg/L was applied) (Lin, L. Z., et al. (2018) The ecological risks of hydrogen peroxide as a cyanocide: its effect on the community structure of bacterioplankton. *J Oceanol Limnol* 36: 2231-2242).

Example 10—Treatment of a *Microcystis* sp. Infested Water Body

Figure 10A:
FIG. 10A-FIG. 10B show photographs of a 75,000 m$^2$ irrigation pond in the Negev that was infested with the *Microcystis* sp. and was treated with 150 kg of copper-based floating formulation (FIG. 10A) before and (FIG. 10B) after the treatment.
Figure 10B:

An irrigation pond infested with a heavy bloom of *Microcystis* sp. of 98 pig/L chlorophyll-a concentrations in the Southern Negev, Israel, was used in November 2017. The surface area of the pond was 75,000 m² and total volume of the reservoir was 1,125,000 m³. A 150 kg of herein disclosed buoyant composition (95% w/w copper sulfate granules, 5% w/w coating) was applied, the total copper level was 2.0 g/m². Four hours post treatment the total copper concentration at 7 m depth was advantageously found to be below the detection levels of the YSI 9300 photometer (<0.00 ppm). Two and a half hours post treatment the copper concentrations at the surface where the buoyant composition was applied was 3 ppm, but below detection levels at 7 m depth. Total cyanobacterial biomass reduction after two days was 97% (see FIG. 10). Dead cells were observed floating on the water surface where they were consumed by heterotrophic bacteria. The total theoretical copper concentrations after 2-3 h of treatment was calculated to be $1.3 \times 10^{-9}$ ppm on average, over the entire volume of the water body.

Examples 11—Lake Treatments

Chippewa Lake (OH, USA): 1.3 km², has been suffering from algal blooms in the past years, preventing recreation in the lake through most of the season. A report prepared for Medina County in May 2019 listed several treatment alternatives ranging in cost from $0.5 million to $1.8 million, none of which were feasible or economical. From an operational point of view, and in terms of sheer size, the lake had fallen under the category of an 'untreatable lake'.

Figure 11:
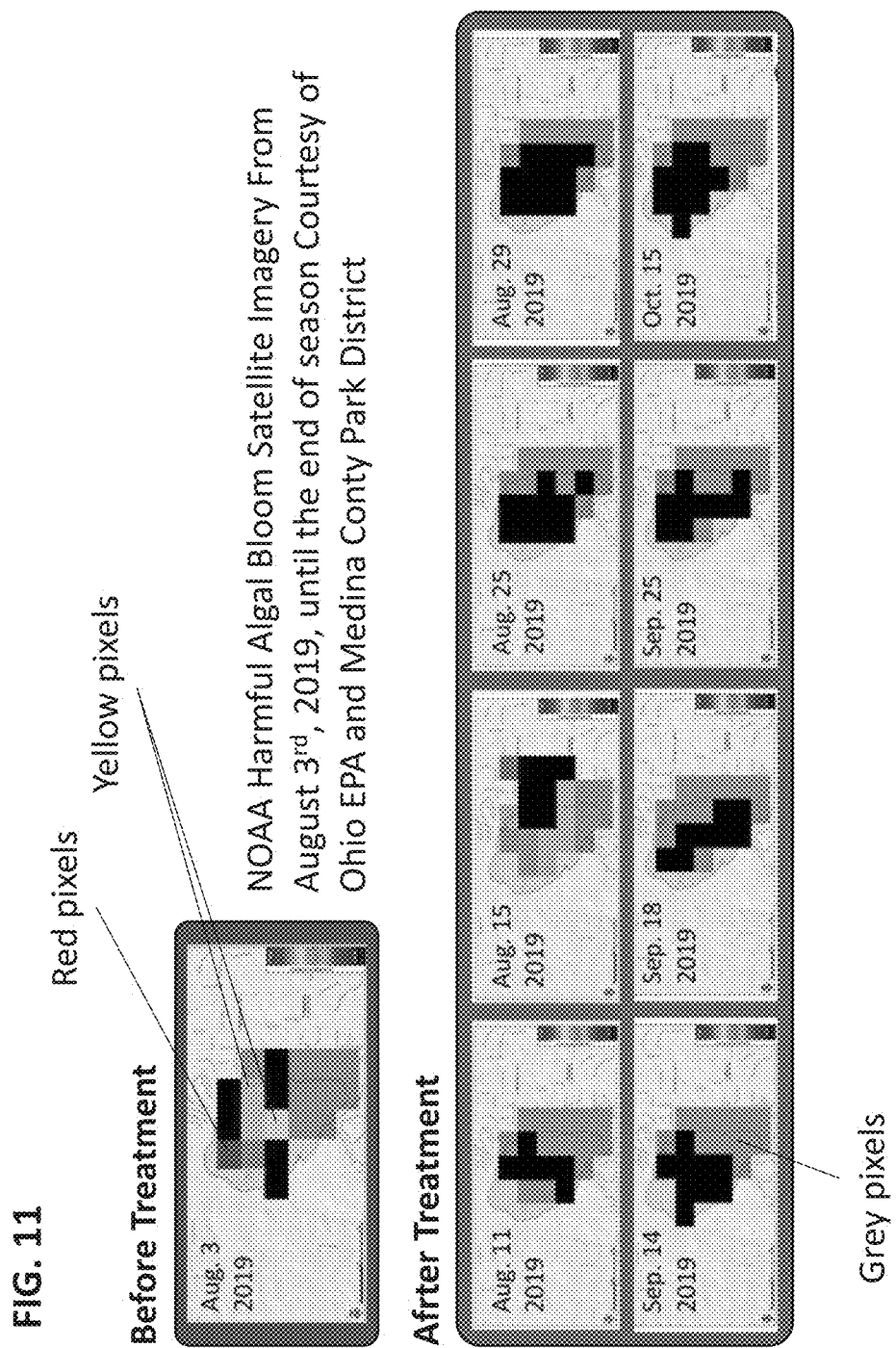
FIG. 11 depicts NOAA satellite imaging showing high levels of cyanobacteria present in Chippewa Lake, Ohio, shortly before treatment (yellow and red pixels on August 3, top panel), that were completely cleared immediately after treatment (August 11 and onward, black pixels, lower panels). Grey pixels represent clouds.

With the goal of highlighting the simple scalability of the herein disclosed method and compositions (95% w/w copper sulfate, 5% w/w coating), cleaning the lake was initiated. The treatment was applied once a surge in cyanobacterial biomass was detected in the lake, reaching an alarming level of 280,000 cells/ml (14 times the standard), corresponding with an increase in cyanotoxin levels from 0.18 ppm to 0.25 ppm over a one-week period. The surge in cyanobacterial levels was visible to the naked eye, with cyanobacterial mats spotted on the eastern shore of the lake, corresponding with NOAA satellite imaging taken on August 3 (FIG. 11)—indicating high levels of cyanobacteria that covers over 50% of the surface of the lake.

Sampling Method: Using YSI ProDSS probe dissolved oxygen (DO), pH, chlorophyll-b (Chl-b is a proxy to determine the total biomass of green algae), phycocyanin (PC, is a proxy to determine the total biomass of cyanobacteria) were measured. Clogging Potential Meter: a quantifier of the amount of the total solids in the water, measured in the time it takes the water to clog a filter under constant pressure. Microscopy: a qualitative sampling of the microorganisms in the aquatic environment. Total phytoplankton was concentrated on a 33 µm filter, using a sample volume of 3-4 gallon. Secchi Disk: Measures water clarity/turbidity. Satellite imaging for the presence of TCOs (provided by the National Oceanic and Atmospheric Administration, NOAA). ELISA test for microcystin, a cyanotoxin. This test measures the microcystin levels in the water. Samples were taken weekly from two fixed points on the eastern side of the lake (provided by the Medina County Park District). YSI 9300 photometer: measures total copper ion concentration (Cu+2), hydrogen peroxide ($H_2O_2$) concentration, and alkalinity.

Starting on Aug. 5, 2019, all measurements, except for satellite imaging and ELISA tests, were taken daily, for 9 days, at 8 am every morning, from four different sampling points around the lake. Cyanotoxin levels (ELISA laboratory testing), and total coverage of cyanobacterial mats on the water surface (satellite imaging), were assessed independently by the local authorities.

A first assessment application of ~0.9 lb/acre was applied on day 3, August 7th, in order to determine wind and current directions and dispersal patterns on the surface of the water. An operational application followed on August 8th at a rate of 4.5 lb/acre. Results were analyzed and normalized against day 3.

Application Method:

The herein disclosed composition (here 95% w/w copper sulfate granules, 5% w/w coating) was applied directly from a boat during the morning hours at a total dose rate of ~5 lb/acre. The product, packaged in 50-lbs bags, was gravity released from the edge of a moving boat. Once the waterborne product was organized over the western perimeter of the lake, it was carried by winds and currents that scattered the floating particles alongside cyanobacterial aggregates. The total application time of 1,500 lb composition was less than 30 minutes. Within a few hours, no algicidal particle were visible to the naked eye. Boating activities were not interrupted throughout the time of application. Measurements taken two-hours post-treatment indicated negligible levels of copper ions (average of 0.3 ppm) in the immediate hours post-treatment, dropping to below detection levels in the following day.

Figure 12A:
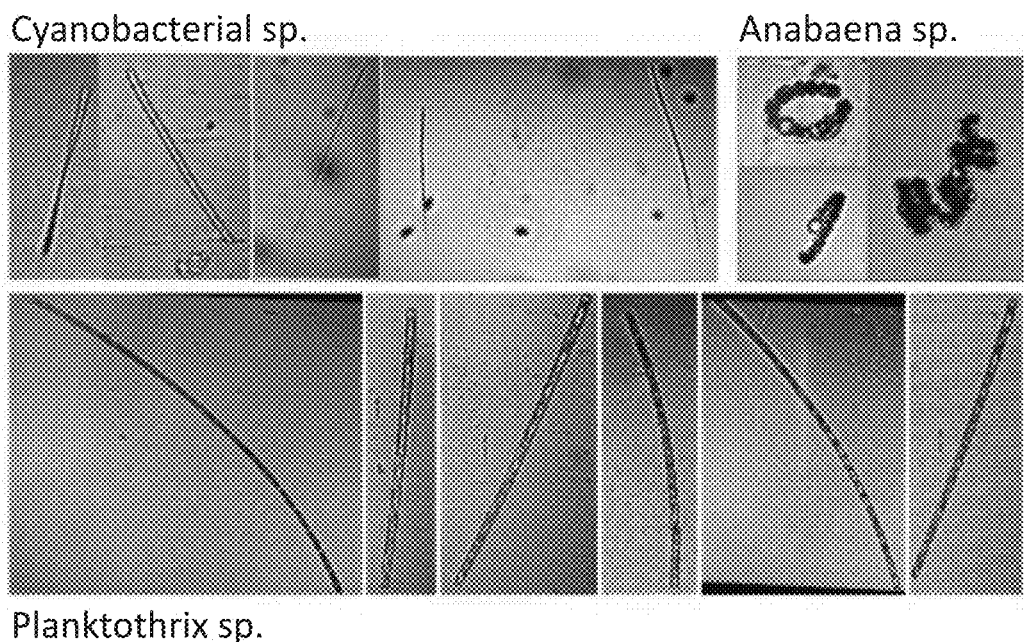
FIG. 12A-FIG. 12B show Qualitative microscopic images of (FIG. 12A) Pre-treatment, most of the phytoplankton captured by the microscope was of cyanobacterial species, mostly *Planktothrix* sp. and *Anabaena* sp.
Figure 12B:
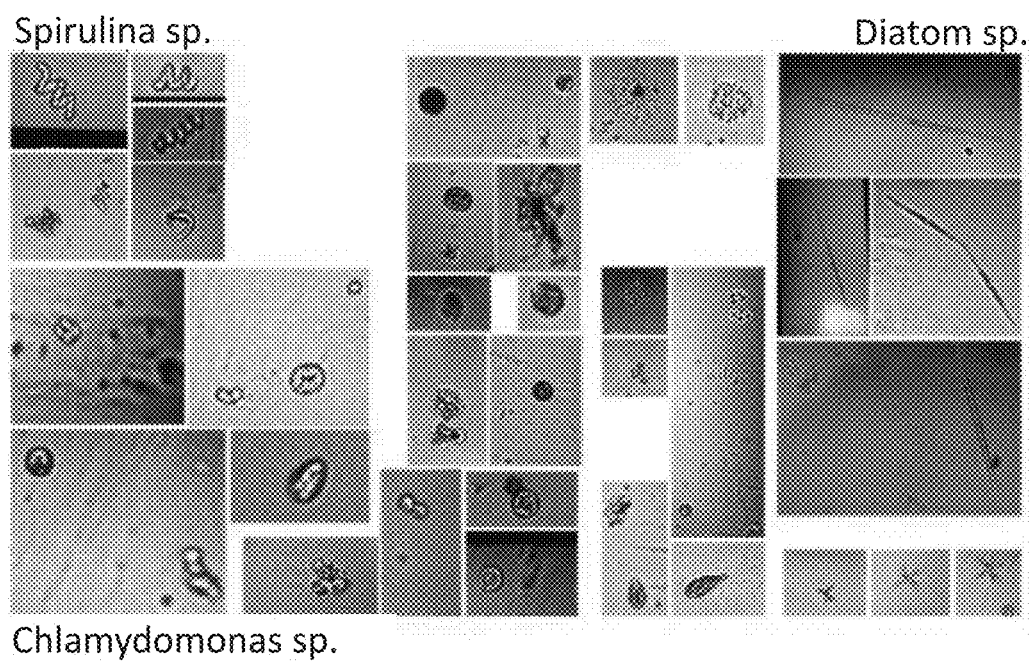

Results and Discussion:

Post-treatment phytoplankton assessments indicated a clear and immediate shift from dominating toxic cyanobacterial species (primarily *Anabaena* sp. and *Planktothrix* sp.) towards a healthy variety of eukaryotic non-toxic green algae including Diatoms and different *Chlamydomonas*-like species (FIG. 12). Interestingly, the non-toxic cyanobacterium *Spirulina* sp. was also observed after the treatment. This strain is used as a "super-food" and is not considered toxic.

Changes in chlorophyll-b (Chl-b) and phycocyanin (PC) levels strongly correlated with the qualitative results obtained by microscopic imaging. The lake's 'Resistance Index' to cyanobacteria, which can be assessed by the ratio between Chlorophyll-b and PC (total eukaryotic green algal biomass vs. cyanobacterial biomass) increased significantly by 250% (FIG. 13), indicating a clear shift in the balance of power between these two natural competitors—in favor of non-toxic species.

Figure 14:
FIG. 14 is a picture of the Chippewa Lake, Ohio, showing protein foam formation throughout the lake, day 3 post-treatment.

The amplified cycle ensued by the treatment, namely the collapse of cyanobacterial populations after the treatment, followed by the prolonged oxidative stress due to the production of hydrogen peroxide, which again results in programmed cell death of naïve cyanobacterial populations, was observed in Chippewa Lake days after the treatment. Tens of acres of water surface were covered with a grayish-beige color of protein-based-foam (FIG. 14). This phenomenon is attributed to cyanobacterial cell-lysis and is a clear indication that cyanobacterial cell-death continued progressing for days after treatment, long after copper levels were undetectable in the water (as detailed hereinafter).

Figure 15:
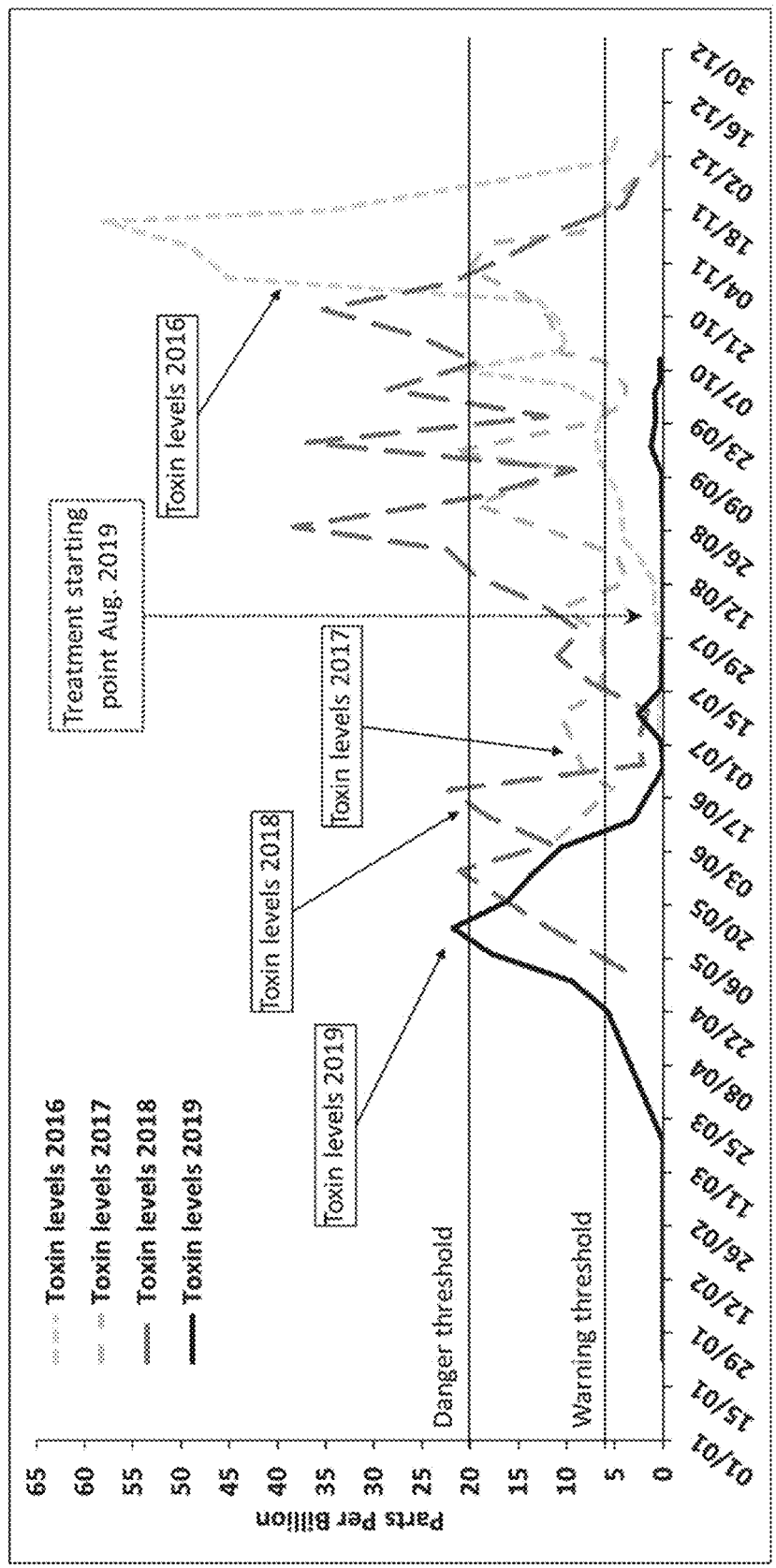
FIG. 15 shows microcystin levels measured in Chippewa Lake since the Medina County Park District initiated weekly measurements of cyanotoxins in 2016. The lake freezes between December and March. Red dotted arrow indicated the initiation of the treatment with the herein disclosed composition.

Microcystin levels remained very low post-treatment (FIG. 15), indicating that the timing of the treatment, at the early stages of the bloom-surge, was effective. The sharp decline in cyanobacterial biomass did not result in an increase in cyanotoxin-levels, confirming that the cyanobacterial cells were at their lag-phase stage, when cyanotoxin-accumulation in the cells is minimal (Wood et al., 2010). Had the treatment been applied a week or two later, during the exponential growth phase of toxin-producing cyanobacteria, the levels of the cyanotoxins would have been much higher.

The pH levels, post-treatment, dropped from pH 8.5 to pH 7.95 (August 9-11), a result of the reduction in overall photosynthetic activity (as a proxy to the relative decline in phytoplankton total biomass). Within 4 days (August 12), pH levels rose to pH of 8.35 indicating the re-initiation of photosynthetic activity by new, predominantly non-toxic phytoplankton variety (FIG. 12 and FIG. 13).

An additional confirmation about the advantages of early treatment, and its impact on the aquatic environment, came from the unchanged dissolved oxygen levels before, during and after treatment (FIG. 13)—averting the risk of fish kill due to oxygen depletion (a typical outcome upon the collapse of a massive bloom). In fact, no evidence for any adverse impact to either the fauna or the flora of the lake was observed.

Figure 13:
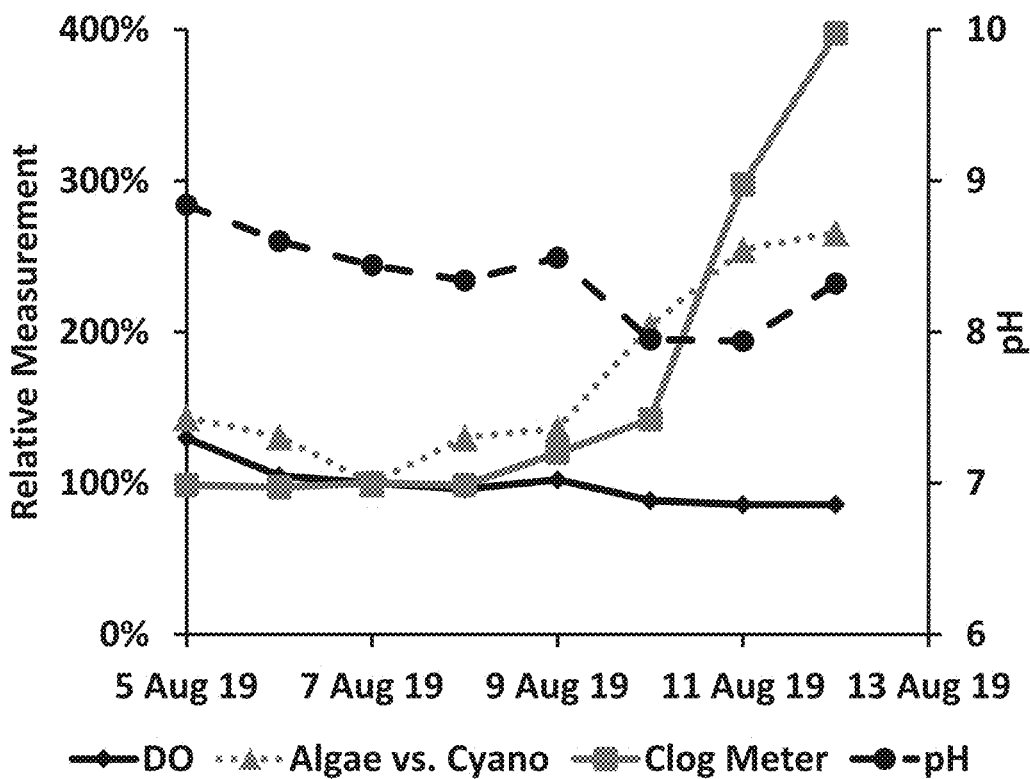
FIG. 13 shows relative measurements of Dissolved Oxygen (DO); the ratio of total eukaryotic algal biomass vs. cyanobacterial biomass—the 'Resistance Index' (Algae vs. Cyano); Clogging potential meter; and pH. The measurements were taken daily, at 8 am, for 9 consecutive days and from different points in the lake. The measurements of DO, Algae vs. Cyano, and Clog Meter were normalized to day 0.

The clogging potential meter, which indicates the total solids in the water, improved significantly by 400% immediately after treatment (FIG. 13). This measurement serves as an additional indication to the change in populations in favor of non-toxic species: cyanobacteria are known to release significant quantities of polysaccharides into the water (Harel et al., 2012), which increase water viscosity, and is associated with the 'swimmer's itch' nuisance. Controlling polysaccharide concentrations in the water, due to the collapse of cyanobacterial communities, breaches yet another 'wall' in the cyanobacterial defense mechanism against its natural competition, further enhancing the 'Resistance Index' against cyanobacteria. Breaking said network of polysaccharide production contributed to the water's increased filterability, as indicated by the clogging meter results. Copper ions (Cu+2) concentration in the water, sampled at 15-30 cm (6-12 inches) below water surface after 1-2 hours of the application, averaged around 0.3 ppm. The copper ion concentration in days 1-3 post-treatment was <0.00 ppm. Water alkalinity levels remained unchanged before and after treatment, at the range of 80 ppm (mg/L).

Combined, the results above indicate that the herein disclosed composition and method of use was selective against toxic cyanobacteria and rehabilitated the ecological ecosystem in the lake in favor of beneficial species, which subsequently act as a biological buffer that prevents cyanobacteria from reestablishing dominance in the aquatic system. Surprisingly, the effect of the treatment was still preserved when last measured in January 2020, thus confirming the 'self-healing' of the lake by re-establishing of a desired and sustainable ecological balance.

Israel, Nitzanim Reservoir (Seasonal Treatment):

Nitzanim Reservoir retains water for irrigation purposes. Prevention of blooms in the reservoir is key to its continuous operation. It is required to supply its clients with water that meets both bacterial standards as well as filterability standards at all times.

Israeli water associations operate some 600 reservoirs (10-190 acres in size) all over the country, designed to retain and manage recycled wastewater for irrigation.

Cyanobacterial outbreaks occur regularly in these reservoirs, likely due to multiple reasons including a high level of nutrients (e.g., phosphates and nitrates), high temperatures and sunlight intensity. Noticeably, water alkalinity is very high, ranging between 500-800 mg/l $CaCO_3$.

Over the years, Israeli irrigation ponds have been continuously treated with raw copper at a dose rate of 10-20 kg/acre (20-40 lb/acre); applied either from crop-dusters or manually, from a boat. The effectiveness of the treatment was rather poor, thus demanding frequent treatment. In many cases, the superintendents are forced to open and clean up pumps and filters, sometimes on a daily basis to maintain water flow. Eventually, as water levels decrease towards the end of the irrigation season, most reservoirs are forced to arrest the water flow due to condensed algal blooms that clog and damage the pumps.

Materials and Methods:

The reservoir has a surface area of 15 acres and is about 50 ft deep (~2.6 million cubic ft). It was monitored 2-3 times every week between January and June of 2018.

Measurements:
Chlorophyll-a (as an indicator for total phytoplankton) was measured by a handheld device (FluoroSense™, by Turner Designs, USA).
pH
Temperature
Total particulate matter was assessed using a Clogging Potential Meter (Israel Water Works Association, Israel) with a 33 μm sieve filter. This device measures the time it takes for the sieve to clog under constant water pressure. In principle, the longer it takes for the filter to clog—the better is the water quality.

Water was sampled from the intake flow in a fixed location in the middle of the reservoir, 6 feet above the bottom of the reservoir, and 45 feet below the surface when the reservoir is full.

Sampling was conducted in triplicates. All results were averaged for each sampling point. Algal population analysis was conducted by a microscope observation using hemocytometer cell count chamber.

Treatment Protocol

The treatments were conducted in accordance with the status of the algal biomass as well as the water's filterability status. The parameters presented were measured in the field and the company's laboratory.

Results and Conclusions:

A mix of toxic cyanobacterial species (*Anabaena* sp. and *Microcystis* sp.) constituted over 95% of the entire phytoplankton populations in the reservoir prior to treatment.

Figure 16:
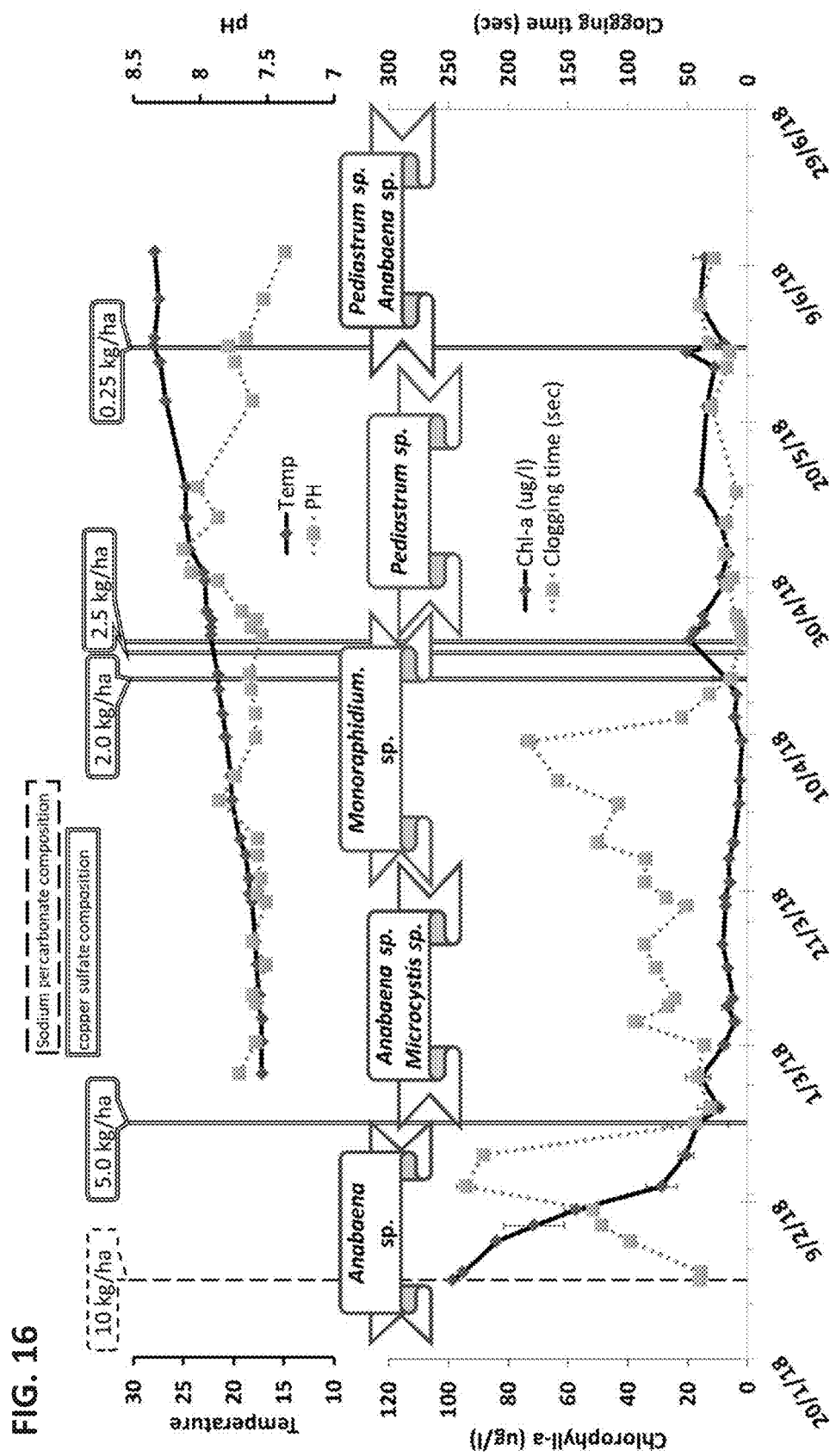
FIG. 16 depicts the outcome of a seasonal treatment with the herein disclosed compositions in the irrigation reservoir of Kibbutz Nitzanim, indicating the dramatic impact of the treatment on algal levels, its prolonged effect, as well as its ability to influence species-variety in favor of non-toxic ones (1 kg/ha.≈1 lb/acre).

An initial treatment with the herein disclosed compositions (a first treatment a composition of 98% w/w sodium percarbonate and 2% coating material followed by treatments with a 95% w/w coated copper sulfate composition as indicated in FIG. 16) caused the total collapse of the toxic bloom, keeping it for months to-come below dangerous levels (FIG. 16). Analysis of the phytoplankton population clearly indicated that the treatment outcome underscored "Killing the Winner" paradigm, whereby the dominant species were severely affected by the treatment, allowing non-harmful eukaryotic algal species, mostly *Monorapridium* sp. and *Pediastrum* sp. (far less sensitive to the treatment), to occupy the "vacant" ecological niche (FIG. 16).

Figure 17:
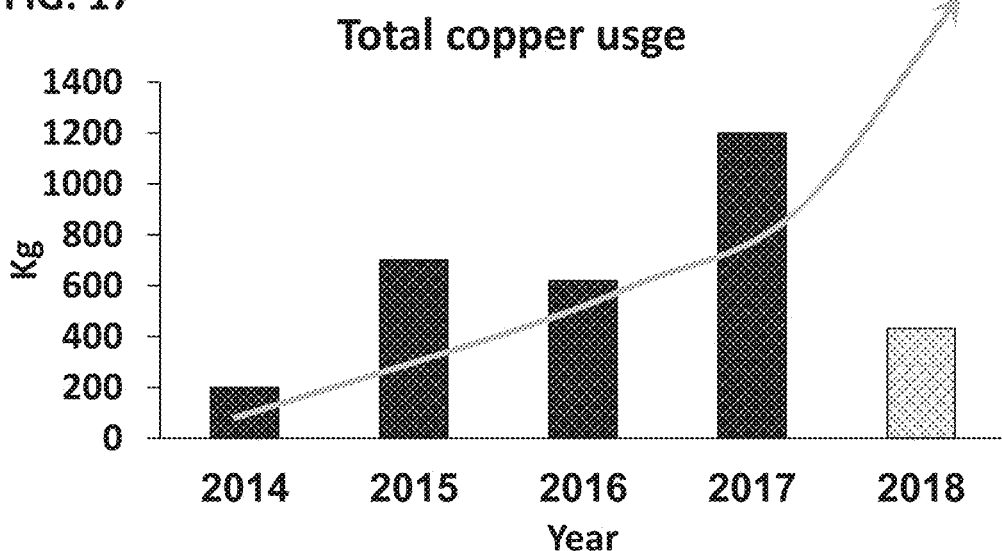
FIG. 17 shows the amount of copper used as an algaecide in the Kibbutz Nitzanim irrigation reservoir during the years 2014-2018.

Advantageously, the overall amount of copper applied in 2018, using the herein disclosed composition, was ⅓ of that used in the year before (FIG. 17) despite the intensification of toxic blooms in a nearby water body. Considering the ~200% yearly rise in cyanobacteria populations in various water bodies in Israel between 2014-2017, the actual reduction in copper applied in 2018, using Lake Guard™, is closer to ~85%.

Since its launch in Israel in mid-2018, the herein disclosed composition (containing 98% (w/w) sodium percarbonate) has, in record speed, acquired ~90% market-share.

China, Taihu Lake (near Yixing):

The pilot was conducted in an old fishpond (7,100 m², ~2 acres), in the vicinity of Lake Tai, across a similarly contaminated 'corridor' linking a waterway between the city of Yixing and Lake Tai. Ongoing efforts to deal with loads of cyanobacteria streaming through this 'corridor', both from the lake as well as from the city at an average annual cost of $25 million, have been fruitless.

The fishpond, which was contaminated with a very high cyanobacterial biomass, was treated with a large dose to achieve an immediate decline of biomass levels.

Since launching in June 2019—multiple applications in different setups took place in China. A recent example from a pilot designed in preparation for a cleanup project of the waterways of Yixing (FIG. 18), on the shores of Lake Tai, one of the most known and worst cases of large-scale toxic blooms (~2,250 km²).

Description of Application:

The fishpond was dosed with herein disclosed composition (98% w/w sodium percarbonate and 2% coating material) on August 7 and on Aug. 8, 2019.

The particles of the composition were applied so as to travel with the currents and the wind across the pond, interacting with the phytoplankton inhabiting the pond. Two consecutive treatments were applied. Each application lasted less than 5 min. By the afternoon of August 8th, ~6 h after the second application, all water parameters have indicated a complete collapse of the bloom. One example (FIG. 19) is the initial decline in chlorophyll and steeper decline of phycocyanin representing changing levels of phytoplankton and cyanobacteria, respectively.

Two weeks later, the phytoplankton population, composed of eukaryotic green algae, showed a tremendous recovery with beneficial-species replacing and likely outcompeting toxic cyanobacteria, and maintaining a healthy aquatic ecosystem (FIG. 19).

Sampling Methodology:

Throughout the pilot period, quantitative measurements were made by YSI ProDSS probe that measured dissolved oxygen, pH, chlorophyll, and phycocyanin (PC). Chlorophyll (Chl) measurements serve as a proxy for total algal biomass in the water. Phycocyanin (PC) levels serve as a direct proxy to total cyanobacterial biomass.

In parallel, qualitative assessments were made visually.

Figure 19A:
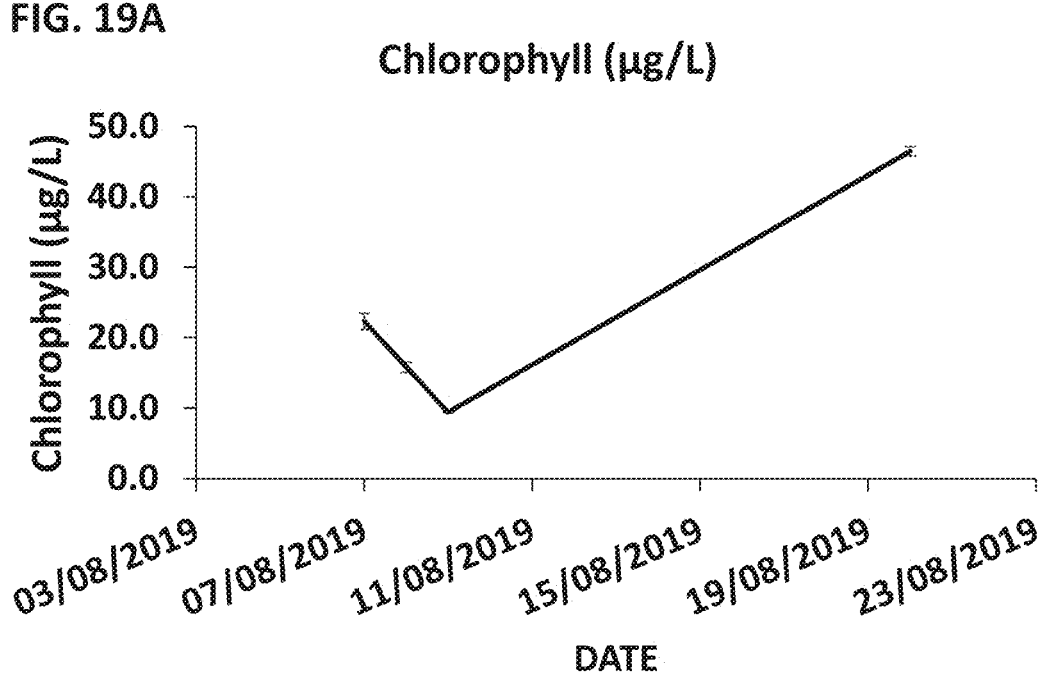
FIG. 19A-FIG. 19B show changes in chlorophyll (FIG. 19A); and phycocyanin (FIG. 19B) following treatment.
Figure 19B:
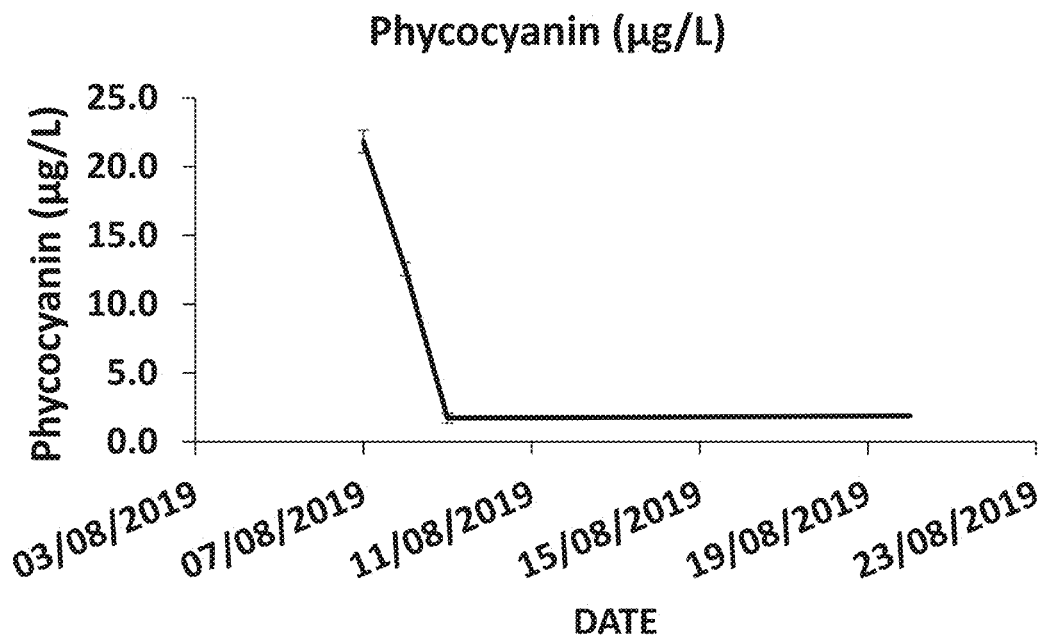

Results:

A. Changes in cyanobacterial and total algal levels:

Prior to treatment (at time 0), the PC and Chlorophyll values were 21.84 µg/l and 22.32 g/l, respectively. After 48 hours, the PC dropped to 1.72 µg/l (−93% from time 0) and Chlorophyll concentration was 9.39 µg/l (−58% from time 0) (FIG. 19A and FIG. 19B).

Two weeks later, on August 20th, the PC values continued to be stagnant at 2.04 µg/l, whereas Chlorophyll concentration increased to 45.34 µg/l (i.e. a 482% increase from its post-treatment lowest point). Since PC levels were not significantly altered in the span of two weeks, the significant rise in Chlorophyll levels reflects the rise in beneficial algal populations over cyanobacterial species.

Figure 20A:
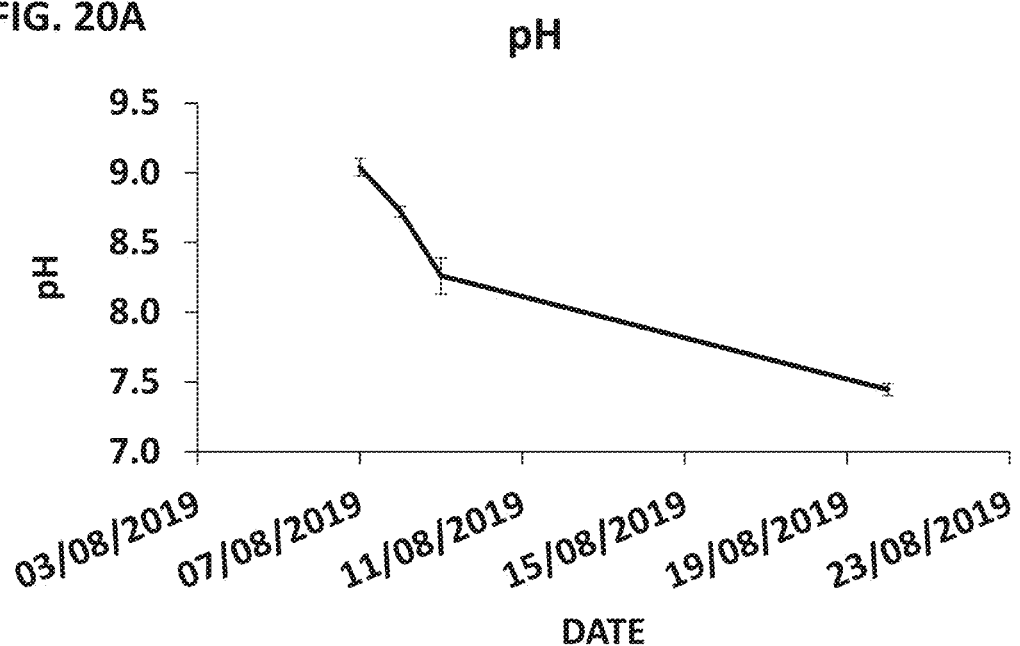
FIG. 20A-FIG. 20B shows changes in pH (FIG. 20A) and dissolved oxygen (FIG. 20B) following treatment.

B. Changes in pH and dissolved oxygen (DO) values:

The dramatic reduction in photosynthetic and respiratory activities (consuming and releasing $CO_2$, respectively) had an immediate and direct influence on the pH (FIG. 20A), which dropped from 9.05 to 8.29 within 48 h. By August 20, two weeks later, pH levels dropped to 7.43.

Figure 20B:
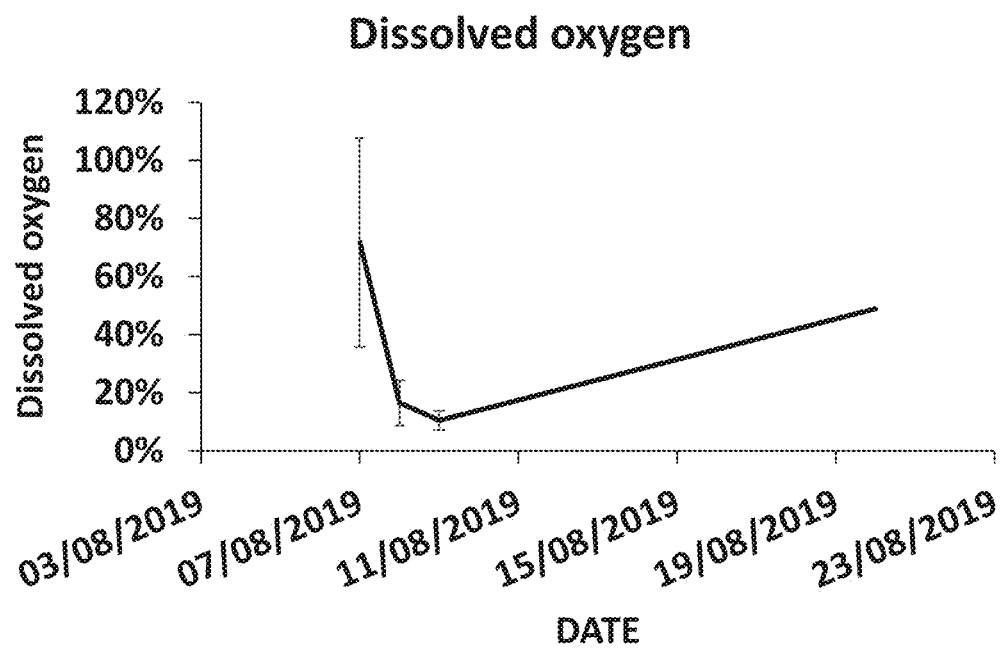

The dissolved Oxygen (DO) levels decreased immediately post-treatment due to bacteria-mediated biodegradation process of dead cyanobacterial biomass that depletes dissolved oxygen, and due to the collapse of oxygen-producing cyanobacteria. The DO levels, however, increased gradually, from its lowest point on day 2, as the oxygen-producing algae started to thrive in the rebalanced aquatic ecosystem—as indicated in the increase in Chlorophyll, but not PC levels (FIG. 20B).

Figure 18:
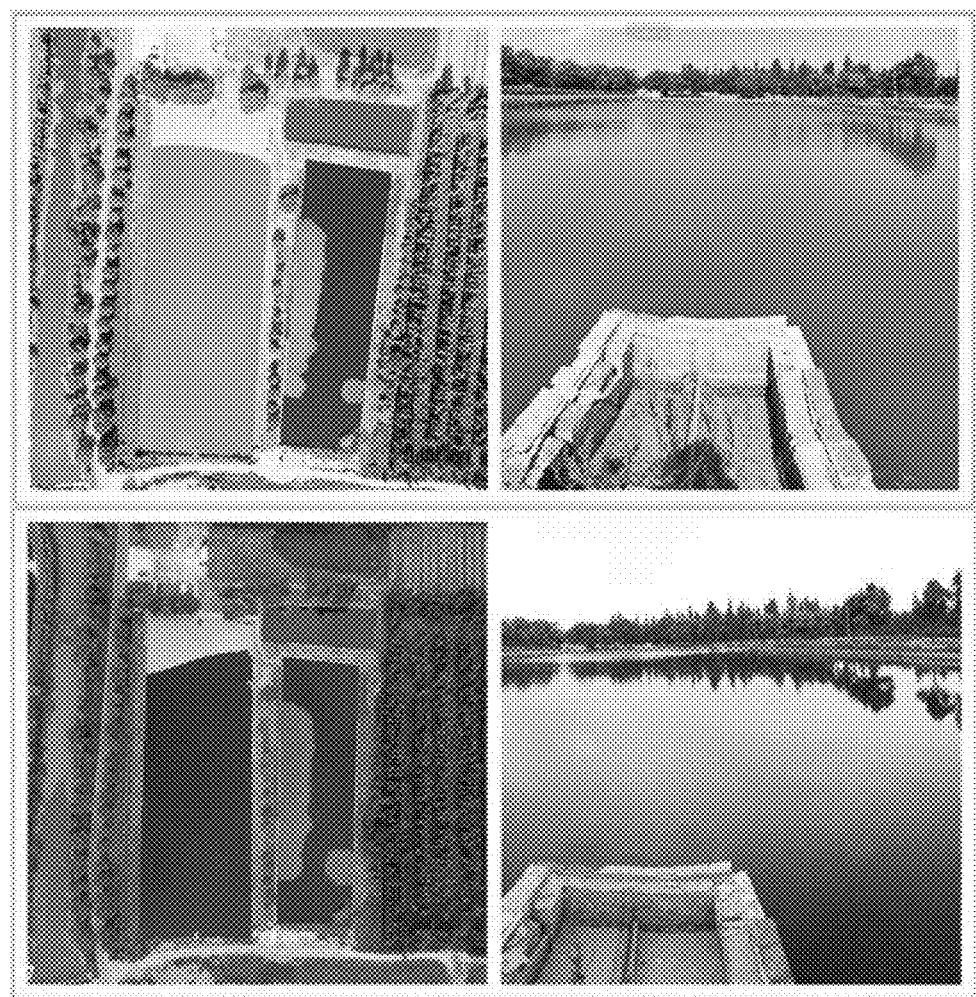
FIG. 18 shows visible changes in the water quality of the pond near Taihu Lake, China treated with Sodium Percarbonate (Lake Guard™ Oxy). The upper panel shows the pond, pre-treatment. The lower panel shows the pond, 12 weeks post-treatment.

Visual inspection of the pond before treatment (upper panels) and after treatment (lower panels) confirmed the efficiency of the treatment (FIG. 18).

Russia, a recreational lake in Park Pobedi, (The Republic of Tatarstan):

The treatment and follow up were conducted between October 2 and Oct. 10, 2018.

The size of the lake was 40,000 m² surface area (10 acres).

Application:

Treatment with herein disclosed composition (98% w/w sodium percarbonate 8 lbs/acre, was performed manually on the morning of Oct. 2, 2018, from the banks of the lake by an untrained local. The application took less than 10 minutes. Once waterborne, the floating, time-releasing particles were pushed by the wind and currents and organized themselves along with cyanobacterial aggregations.

Sampling Methodology:

The lake was inspected, on a regular basis, for the past year by the local superintendent.

Results: No adverse impact was observed to the fauna or the flora in or around the pond, and based on reports from the lake's superintendent (September 2019), no bloom episodes have been detected in the lake since the single treatment with the herein disclosed composition in October of 2018, a year earlier. This is in sharp contrast to previous years, where harmful algal blooms plagued the lake yearly.

While certain embodiments of the invention have been illustrated and described, it should be clarified that the invention is not bound by the specific embodiments described herein. Numerous modifications, changes, variations, substitutions and equivalents will be apparent to those skilled in the art without departing from the spirit and scope of the present invention as described by the claims, which follow.

The invention claimed is:

1. A composition for mitigating, inhibiting, and/or eliminating phytoplankton growth in a waterbody, the composition comprising granules comprising
   an algicide at a concentration of 80.0-99.5% (w/w) of the composition, wherein the algicide comprises an agent selected from the group consisting of hydrogen peroxide, sodium percarbonate and calcium hypochlorite; and
   a hydrophobic water insoluble coating material at a concentration of 0.5-20% (w/w) of the composition, wherein the coating material is selected from a saturated or unsaturated fatty acid, a triglyceride or any combination thereof;
   wherein the critical surface tension of the composition is between 15-60 dyn/cm, the melting temperature of the composition is 50-90° C. and an acid value of the composition is 3-8 mg KOH per gram and wherein the relative density of the composition, prior to being submerged in water, is above 1.0 g/cm³ such that the composition initially sinks after being applied, and wherein the composition becomes floating 0.25-60 minutes after being submerged in water, thereby causing a surfacing of the composition to mitigate, inhibit and/or eliminate phytoplankton growth in the waterbody.

2. The composition according to claim 1, being formulated such that the algicide is released into the water at water temperatures below 45° C. within 24 hours of being applied.

3. The composition according to claim 1, being formulated as granules with a granule size in the range of 100-1500 µm.

4. The composition according to claim 1, being formulated as granules with a granule size in the range of 1-10 mm.

5. The composition according to claim 1, wherein the granules have a viscosity of 6-8 cP at 70° C.

6. The composition according to claim 1, wherein the composition comprises granules with different concentrations of coating material.

7. The composition of claim 6, wherein the granules comprise granules having 0.5-2.5% w/w coating material mixed together with granules having 3-10% coating material, leading to slow/extended release of the algicide, and/or an extended period of exposure of the cyanobacteria to the algicide.

8. The composition according to claim 1, wherein the composition is configured to stay submerged at a depth of about 0.02-1 m below the surface of the water system after having been applied and/or after having resurfaced.

9. The composition according to claim 1, wherein the coating material has a partition coefficient (log P) of 1.5 or above.

10. The composition according to claim 1, wherein the composition has a critical surface tension of between 20-45 dyn/cm.

11. The composition according to claim 10, wherein the composition has a critical surface tension of between 28-35 dyn/cm.

* * * * *